(12) United States Patent
Lu et al.

(10) Patent No.: US 11,533,474 B2
(45) Date of Patent: Dec. 20, 2022

(54) VIDEO CODING USING REFERENCE PICTURE RESAMPLING SUPPORTING REGION OF INTEREST

(71) Applicant: Dolby Laboratories Licensing Corporation, San Francisco, CA (US)

(72) Inventors: Taoran Lu, Santa Clara, CA (US); Fangjun Pu, Sunnyvale, CA (US); Peng Yin, Ithaca, NY (US); Sean Thomas McCarthy, San Francisco, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/422,710

(22) PCT Filed: Mar. 11, 2020

(86) PCT No.: PCT/US2020/022071
§ 371 (c)(1),
(2) Date: Jul. 13, 2021

(87) PCT Pub. No.: WO2020/185879
PCT Pub. Date: Sep. 17, 2020

(65) Prior Publication Data
US 2022/0286667 A1    Sep. 8, 2022

Related U.S. Application Data

(60) Provisional application No. 62/983,832, filed on Mar. 2, 2020, provisional application No. 62/945,931, filed
(Continued)

(51) Int. Cl.
*H04B 1/66*  (2006.01)
*H04N 7/12*  (2006.01)
(Continued)

(52) U.S. Cl.
CPC ......... *H04N 19/105* (2014.11); *H04N 19/132* (2014.11); *H04N 19/174* (2014.11); *H04N 19/46* (2014.11); *H04N 19/70* (2014.11)

(58) Field of Classification Search
CPC ........................... H04N 19/167; H04N 19/70
See application file for complete search history.

(56) References Cited

U.S. PATENT DOCUMENTS 9,554,132 B2   1/2017  Crenshaw
10,063,886 B2  8/2018  Ye
(Continued)

FOREIGN PATENT DOCUMENTS

JP    2016506691 A    3/2016
JP    2016226035 A    12/2016
JP    2017005723 A    1/2017

OTHER PUBLICATIONS

B. Brass, J. Chen, S. Liu, and Y-K. Wang "Versatile Video Coding (Draft 8)," JVET output document, JVET-Q2001, vC (12), uploaded Feb. 9, 2020.
(Continued)

*Primary Examiner* — Fabio S Lima

(57) ABSTRACT

Methods, systems, and bitstream syntax are described for canvas size, single layer or multi-layer, scalable decoding, with support for regions of interest (ROI), using a decoder supporting reference picture resampling. Offset parameters for a region of interest in a current picture and offset parameters for an ROI in a reference picture are taken into consideration when computing scaling factors to apply reference picture resampling. Syntax elements for supporting ROI regions under reference picture resampling are also presented.

10 Claims, 11 Drawing Sheets

Reference picture (R)

Current picture (C)

Related U.S. Application Data on Dec. 10, 2019, provisional application No. 62/902,818, filed on Sep. 19, 2019, provisional application No. 62/883,195, filed on Aug. 6, 2019, provisional application No. 62/850,985, filed on May 21, 2019, provisional application No. 62/816,521, filed on Mar. 11, 2019.

(51) Int. Cl.

| | | |
|---|---|---|
| *H04N 11/02* | (2006.01) | |
| *H04N 11/04* | (2006.01) | |
| *H04N 19/105* | (2014.01) | |
| *H04N 19/132* | (2014.01) | |
| *H04N 19/70* | (2014.01) | |
| *H04N 19/46* | (2014.01) | |
| *H04N 19/174* | (2014.01) | |

(56) References Cited

U.S. PATENT DOCUMENTS

| | | | |
|---|---|---|---|
| 10,110,890 B2 | 10/2018 | Haque | |
| 10,116,952 B2 | 10/2018 | Lin | |
| 10,148,983 B2 | 12/2018 | Hendry | |
| 2009/0304085 A1* | 12/2009 | Avadhanam | H04N 19/117 375/240.24 |
| 2011/0243252 A1 | 10/2011 | Mito | |
| 2012/0177121 A1* | 7/2012 | Tripathi | H04N 19/154 375/E7.243 |
| 2013/0034170 A1 | 2/2013 | Chen | |
| 2015/0201198 A1 | 7/2015 | Marlatt | |
| 2016/0073118 A1 | 3/2016 | Iguchi | |
| 2016/0073119 A1 | 3/2016 | Toma | |
| 2016/0165276 A1 | 6/2016 | Toma | |
| 2016/0191932 A1 | 6/2016 | Toma | |
| 2016/0295257 A1 | 10/2016 | Iguchi | |
| 2017/0105015 A1 | 4/2017 | Haque | |
| 2017/0105019 A1 | 4/2017 | Redmann | |
| 2017/0127070 A1 | 5/2017 | Suzuki | |
| 2017/0264861 A1 | 9/2017 | Xu | |
| 2017/0359611 A1 | 12/2017 | Iguchi | |
| 2018/0063542 A1 | 3/2018 | Haque | |
| 2019/0045116 A1 | 2/2019 | Yamamoto | |
| 2019/0123833 A1* | 4/2019 | Chiu | H04N 19/44 |

OTHER PUBLICATIONS

Bross, B. et al "Versatile Video Coding (Draft 7)," JVET output document, JVET-P2001, vE (14), uploaded Nov. 14, 2019.

Choi, B. et al "AHG8: Region-Wise Scalability Support with Reference Picture Resampling" Jul. 2019.

High efficiency video coding, H.265, Series H, Coding of moving video, ITU, (Feb. 2018).

Ichimura, D. et al "A Tool for Interactive ROI Scalability" ISO/IEC JTC1/SC29/WG11, Jul. 2005, Poznan Poland.

Lu, T. et al "AHG8: Support of ROI (Region-of-Interest) RPR" JVET meeting, Jan. 2020, The Joint Video Exploration Team of ISO/IEC JTC1.

Lu, T. et al "AHG8: Support of ROI (Region-of-Interest) Scalability" MPEG Meeting, Oct. 2019.

Omori, Y. et al "A 120 fps High Frame Rate Real-Time HEVC Video Encoder with Parallel Configuration Scalable to 4K" IEEE Transactions on Multi-Scale Computing Systems, vol. 4, No. 4, Oct.-Dec. 2018, pp. 491-499.

Wenger, S. et al "AHG8: Spatial Scalability Using Reference Picture Resampling" JVET of ITU-T SG 16 WP 3 and ISO/IEC JTC 1/SC 29/WG11, Jul. 2019.

Skupin, R. et al., AHG12: "On filtering of independently coded region," JVET-O0494 (v3), JVET Meeting, Gothenburg, SE, Jul. 2019.

Wang, Ye-Kui, et al "AHG8:Scalability for VVC—General" JVET of ITU-T SG 16 WP 3 and ISO/IEC JTC 1/SC29/WG11, Jul. 2019.

* cited by examiner

Reference picture (R)

Current picture (C)

VIDEO CODING USING REFERENCE PICTURE RESAMPLING SUPPORTING REGION OF INTEREST

CROSS-REFERENCE TO RELATED APPLICATIONS

The present application is the national stage entry of PCT Application Ser. No. PCT/US2020/022071, filed on Mar. 11, 2020, which claims the benefit of priority to U.S. Provisional Application No. 62/816,521, filed on Mar. 11, 2019, U.S. Provisional Application No. 62/850,985 filed on May 21, 2019, U.S. Provisional Application No. 62/883,195 filed on Aug. 6, 2019, U.S. Provisional Application No. 62/902,818 filed on Sep. 19, 2019, U.S. Provisional Application No. 62/945,931 filed on Dec. 10, 2019 and U.S. Provisional Application No. 62/983,832, filed on Mar. 2, 2020, each of which is incorporated by reference in its entirety.

TECHNOLOGY

The present document relates generally to images. More particularly, an embodiment of the present invention relates to video coding using reference picture resampling (RPR) with support for region of interest (ROI).

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR.

In practice, images comprise one or more color components (e.g., luma Y and chroma Cb and Cr) wherein each color component is represented by a precision of n-bits per pixel (e.g., n=8). For example, using non-linear luminance coding (e.g., gamma YCbCr), images where n≤8 (e.g., color 24-bit JPEG images) are considered images of standard dynamic range (SDR), while images where n>8 may be considered images of enhanced dynamic range. HDR images may also be stored and distributed using high-precision (e.g., 16-bit) floating-point formats, such as the OpenEXR file format developed by Industrial Light and Magic.

Currently, distribution of video high dynamic range content, such as Dolby Vision from Dolby laboratories or HDR10 in Blue-Ray, is limited to 4K resolution (e.g., 4096×2160 or 3840×2160, and the like) and 60 frames per second (fps) by the capabilities of many playback devices. In future versions, it is anticipated that content of up to 8K resolution (e.g., 7680×4320) and 120 fps may be available for distribution and playback. It is desirable that future content types will be compatible with existing playback devices in order to simplify an HDR playback content ecosystem, such as Dolby Vision. Ideally, content producers should be able to adopt and distribute future HDR technologies without having to also derive and distribute special versions of the content that are compatible with existing HDR devices (such as HDR10 or Dolby Vision). As appreciated by the inventors here, improved techniques for the single layer and scalable distribution of video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
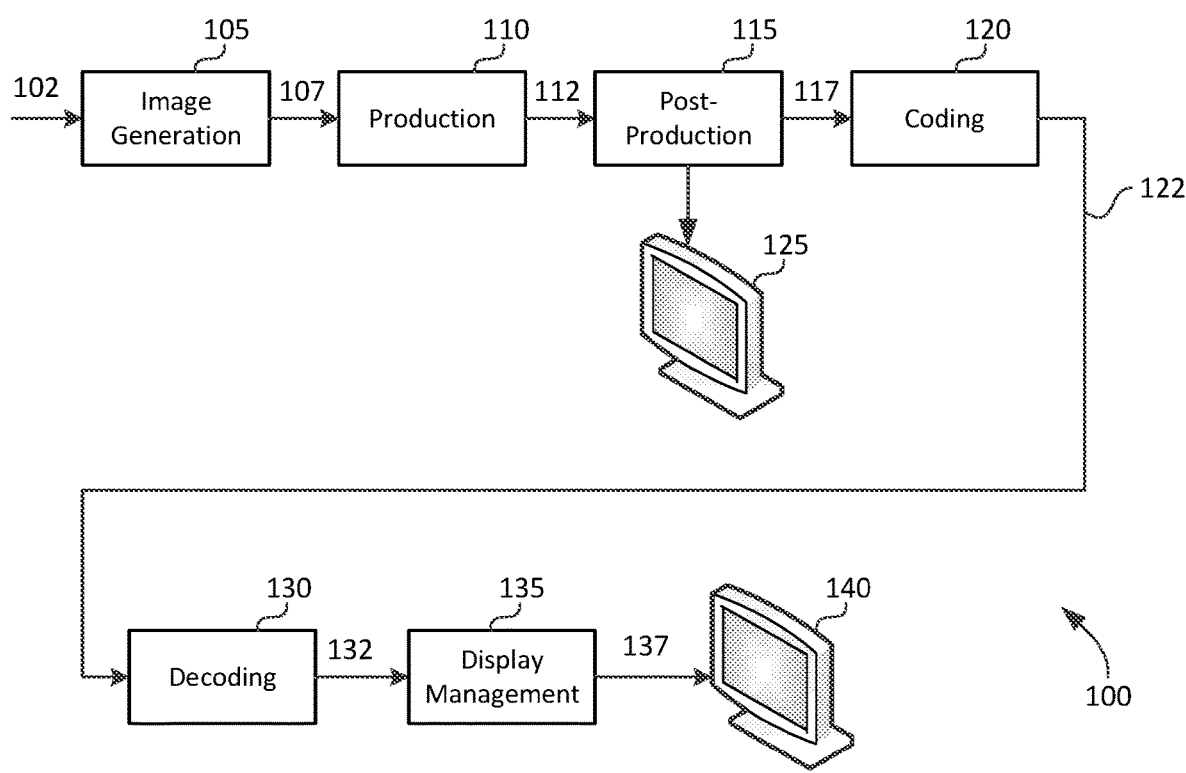
FIG. 1 depicts an example process for a video delivery pipeline.

Example embodiments that relate to canvas size resizing for video coding are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to canvas size resizing or resampling in video coding. In an embodiment, a processor receives a coded bitstream comprising coded pictures and syntax parameters for one or more regions of interest (ROI) within the coded pictures, wherein the syntax parameters comprise a picture header with ROI picture header parameters and a slice header with ROI slice header parameters, wherein the ROI picture header parameters comprise an ROI enabling flag and ROI offset parameters for a scaling window, and the ROI slice header parameters comprise an ROI switch parameter denoting whether ROI scaling is enabled at a slice level and whether the ROI offset parameters in the picture header are applied to a reference picture or a current picture; and decodes a coded region in a current picture in the coded bitstream, wherein decoding the coded region comprises:
for the current picture and an active reference picture in an Inter slice:
initialize 820) a default scaling window in the Inter slice using values defined in a picture parameter set;
if it detects (825) that the ROI enabling flag is set to 1:
overrides (840, 845) the parameters of the default scaling window based on the ROI offset parameters and the ROI switch parameter to generate an ROI scaling window; and applies reference picture resampling (850) using the ROI scaling window.

In a second embodiment, a processor receives a coded bitstream comprising coded pictures and syntax parameters for one or more regions of interest (ROI) within the coded pictures, wherein the syntax parameters comprise a picture header with ROI picture header parameters and a slice header with ROI slice header parameters, wherein the ROI picture header parameters comprise an ROI switch parameter and ROI offset parameters for a scaling window, and the ROI slice header parameters comprise a slice ROI enable flag, wherein the ROI switch parameter denotes whether ROI scaling is enabled, and if enables, whether the ROI offset parameters in the picture header are applied to a reference picture or a current picture; and decodes a coded region in a current picture in the coded bitstream, wherein decoding the coded region comprises:
for the current picture and an active reference picture in an Inter slice:
initializes (820) a default scaling window in the Inter slice using values defined in a picture parameter set;
if detecting (870) using the ROI switch parameter that ROI scaling is enabled:
if detecting that the slice ROI enable flag is enabled:
overrides (840, 845) the parameters of the default scaling window based on the ROI offset parameters and the ROI switch parameters to generate an ROI scaling window; and applies reference picture resampling (850) using the ROI scaling window.

In a third embodiment, a non-transitory processor-readable medium having stored thereon an encoded video stream structure, wherein the encoded video stream structure comprises:
an encoded picture section including an encoding of a sequence of video pictures; and
a signaling section including an encoding of:
syntax parameters for one more regions of interest (ROI) in a current picture and/or in a reference picture, the syntax parameters comprising one or more of:
a picture header flag indicating whether ROI window offset parameters may be used for reference picture rescaling (RPR) or not, left, right, top, and bottom ROI window offset parameters; and a slice ROI switch indicating whether for a current inter slice, ROI scaling is enabled or not, and if enabled, whether the ROI window offset parameters are used to modify a default scaling window for a reference picture or a current picture.

In a fourth embodiment, a non-transitory processor-readable medium having stored thereon an encoded video stream structure, wherein the encoded video stream structure comprises:
an encoded picture section including an encoding of a sequence of video pictures; and
a signaling section including an encoding of:
syntax parameters for one more regions of interest (ROI) in a current picture and/or in a reference picture, the syntax parameters comprising one or more of:
a picture header ROI switch indicating whether ROI window offset parameters may be used for reference picture rescaling (RPR) or not, and whether the ROI window offset parameters are for a reference frame or a current frame, and left, right, top, and bottom ROI window offset parameters; and a slice ROI enable flag indicating whether for a current inter slice, ROI scaling is enabled or not.

Example Video Delivery Processing Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, judder or blur control, frame rate control, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Scalable Coding

Scalable coding is already part of a number of video coding standards, such as, MPEG-2, AVC, and HEVC. In embodiments of this invention, scalable coding is extended to improve performance and flexibility, especially as it relates to very high resolution HDR content.

Canvas Size Scalability

As known in the art, spatial scalability is used mainly to allow a decoder to create content at various resolutions. In embodiments of this invention spatial or canvas scalability is designed to allow extraction of different regions of the image. For example, a content producer may choose to frame content (that is, specify the viewing region) differently for a large display than for a small display. For example, the framed regions to display may depend on the size of the screen or the distance of the screen to the viewer. Embodiments of this invention allow an image to be split into overlapping regions (typically rectangular) or non-overlapping regions and encode them in such a way that a select number of sub-regions can be decoded independently from other sub-regions for presentation.

Figure 2:
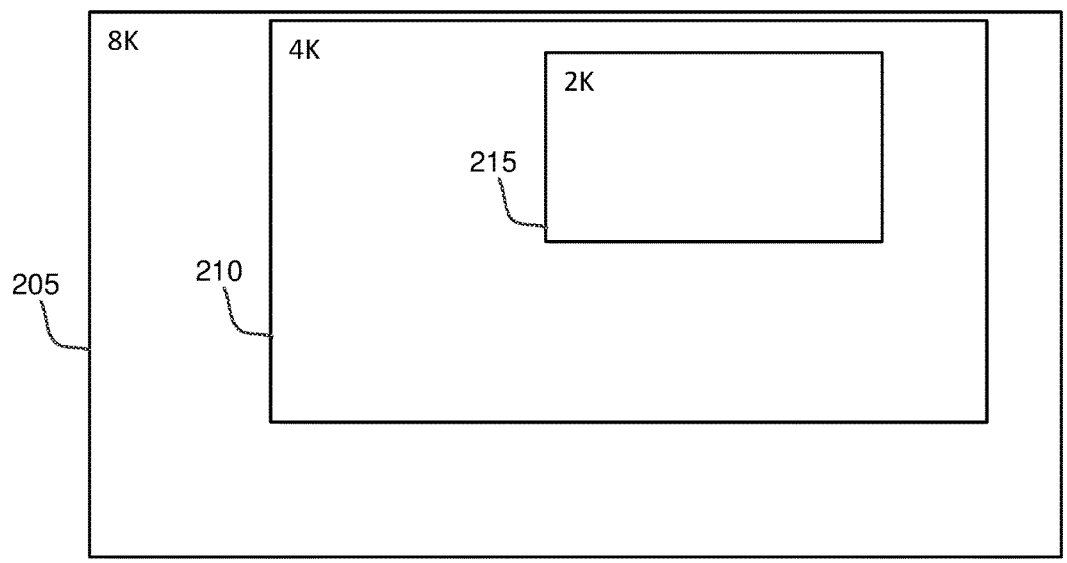
FIG. 2 depicts an example of picture subregions to define viewing regions of the input content according to the resolution of a target display.

An example is shown in FIG. 2 where the various regions encompass and/or are encompassed by other regions. As an example, the smallest region (215) has a 2K resolution and the largest region (205) has an 8K resolution. The base layer bitstream corresponds to the smallest spatial region, while additional layers in the bitstream correspond to increasingly larger image regions. Thus, a 2K display will only display the content within the 2K region (215). A 4K display will display the content of both the 2K and 4K regions (area within 210), and an 8K display will display everything within the border 205. In another example, a 2K display may display a down-sampled version of a 4K content and a 4K display may display a down-sampled version of 8K content. Ideally, the base layer region can be decoded by legacy devices, while the other regions can be used by future devices to extend the canvas size.

Existing coding standards, such as HEVC, may enable canvas scalability using tiles. In a tile representation, a frame is divided into a set of rectangular, non-overlapping regions. A receiver can decide to decode and display only the set of tiles required for display. In HEVC, coding dependencies between tiles are disabled. Specifically, entropy coding and reconstruction dependencies are not allowed across a tile boundary. This includes motion-vector prediction, intra prediction, and context selection. (In-loop filtering is the only exception which is allowed across the boundaries but can be disabled by a flag in the bit-stream.) In addition, to allow the base layer to be decoded independently, encoder-side constraints for temporal motion constrained tiles (MCTS) are needed and temporal motion-constrained-tile sets supplemental enhancement information (SEI) messaging is required. For bitstream extraction and conformance purposes, motion-constrained tile sets extraction information sets SEI message is needed. The drawback of tile definition in HEVC, particularly with independently decoding capability, is loss of coding efficiency.

In an alternative implementation, HEVC allows canvas scalability using a pan-scan rectangle SEI message to extract a region of interest (ROI). SEI messaging specifies the rectangle area, but it does not provide information or constraints that enable the ROI to be decoded independently from other regions. Typically, the decoder needs to decode the full image to get the ROI.

Region of Interest (ROI) Scalability

Figure 3:
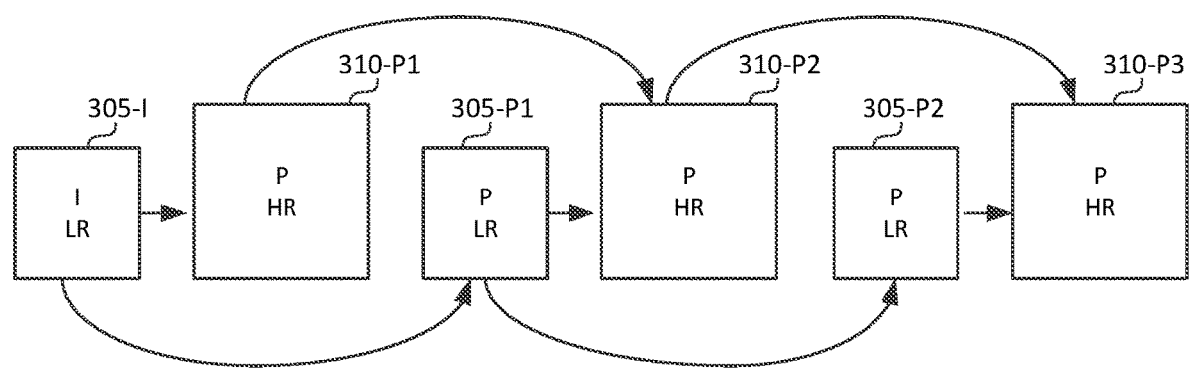
FIG. 3 depicts an example of spatial scalability according to prior art.

The latest specification of VVC (Ref. [2]) describes spatial, quality, and view scalability using a combination of reference picture resampling (RPR) and reference picture selection (RPS), as discussed in more detail in Ref. [3]. It is based on single-loop decoding and block-based, on-the-fly, resampling. RPS is used to define prediction relationships between a base layer and one or more enhancement layers, or, more specifically, among coded pictures which are assigned to either a base layer or one or more enhancement layer(s). RPR is used to code a subset of the pictures, namely those of the spatial enhancement layer(s), at a resolution higher/smaller than the base layer while predicting from the smaller/higher base layer pictures. FIG. 3 depicts an example of spatial scalability according to the RPS/RPR framework.

As depicted in FIG. 3, the bitstream includes two streams, a low-resolution (LR) stream (305) (e.g., standard definition, HD, 2K, and the like) and a higher-resolution (HR) stream, 310, (e.g., HD, 2K, 4K, 8K, and the like). Arrows denote possible inter-coding dependencies. For example, HR frame 310-P1 depends on LR frame 305-I. To predict blocks in 310-P1, a decoder will need to up-scale 305-I. Similarly, HR frame 310-P2 may depend on HR frame 310-P1 and LR frame 305-P1. Any predictions from LR frame 305-P1 will require a spatial up-scaling from LR to HR. In other embodiments, the order of LR and HR frames could also be reversed, thus the base layer could be the HR stream and the enhancement layer could be the LR stream. It is noted that the scaling of a base-layer picture is not performed explicitly as in SHVC. Instead, it is absorbed in inter-layer motion compensation and computed on-the-fly. In Ref. [2], the scalability ratio is implicitly derived using a cropping window.

ROI scalability is being supported in HEVC (Ref. [1]) as part of Annex H "Scalable high efficiency video coding," commonly referred to as SHVC. For example, in Section F.7.3.2.3.4, syntax elements related to scaled_ref_layer_offset_present_flag[i] and ref_region_offset_present_flag[i] are defined. Related parameters are derived in equations (H-2) to (H-21) and (H-67) to (H-68). VVC does not yet support region of interest (ROI) scalability. As appreciated by the inventors, support for ROI scalability could enable canvas-size scalability using the same, single-loop, VVC decoder, without the need for scalability extensions as in SHVC.

Figure 4:
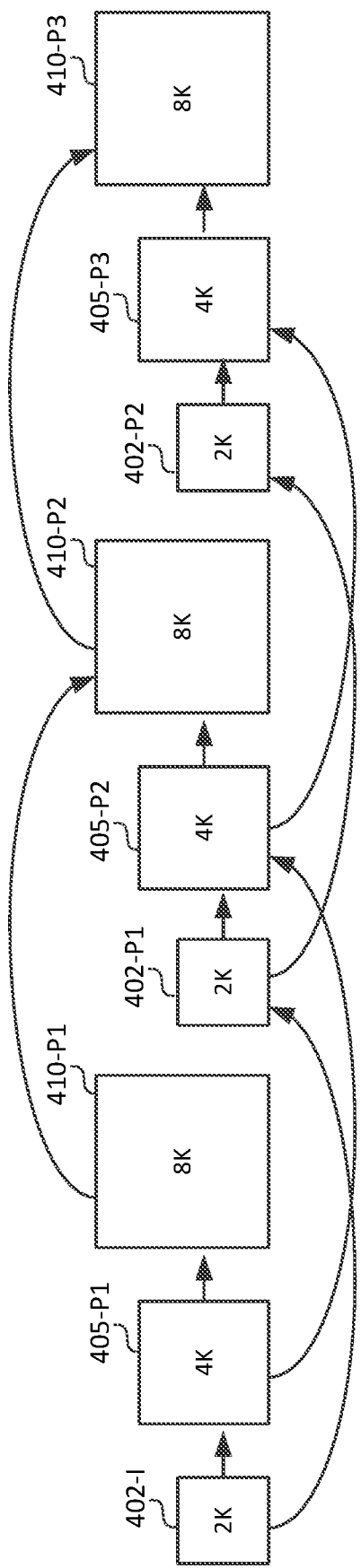
FIG. 4 depicts an example of canvas scalability according to an embodiment of this invention.

As an example, given the three layers of data depicted in FIG. 2 (e.g., 2K, 4K, and 8K), FIG. 4 depicts an example embodiment of a bitstream that supports canvas-size scalability using the existing RPS/RPR framework. As depicted in FIG. 4, the bitstream allocates its pictures into three layers or streams, a 2K stream (402), a 4K stream (405), and an 8K stream (410). Arrows denote examples of possible inter-coding dependencies. For example, pixel blocks in 8K frame 410-P2 may depend on blocks in 8K frame 410-P1, 4K frame 405-P2, and 2K frame 402-P1. Compared to prior scalability schemes that were using multiple-loop decoders, the proposed ROI scalability scheme has the following advantages and disadvantages:

Advantages: Requires a single-loop decoder and does not require any other tools. A decoder needs not to be concerned on how to handle tile/slice/sub-picture boundary issues.

Disadvantages: To decode an enhancement layer, both the base layer and the enhancement layer decoded pictures are needed in the decoded picture buffer (DPB), therefore requiring a larger DPB size than a non-scalable solution. It may also require higher decoder speed because both the base layer and enhancement layer need to be decoded.

A key difference in enabling ROI scalability support between SHVC and proposed embodiments for VVC is that in SHVC the picture resolution is required to be the same for all pictures in the same layer. But in VVC, due to the RPR support, pictures in the same layer may have different resolutions. For example, in FIG. 3, in SHVC, 305-I, 305-P1 and 305-P2 require to have the same spatial resolution. But in VVC, due to RPR support, 305-I, 305-P1 and 305-P2 can have different resolutions. For example, 305-I and 305-P1 can have a first low resolution (say, 720p), while 305-P2 can have a second low resolution (say, 480p). Embodiments of this invention aim at supporting both ROI scalability across different layers and ROI for the pictures of the same layer within the existing the RPR framework. Another major difference is that in SHVC the motion vector from inter-layer prediction is constrained to be zero. But for VVC, such constraint does not exist, and a motion vector can be zero or non-zero. This reduces the constraints for identifying inter-layer correspondence. Next, example embodiments are presented on how ROI may be supported in a single layer bitstream within the existing RPR framework. Similar concepts are also applicable to scalable, multi-layer, coding.

Region of Interest (ROI) for Single Layer Bitstream

Figure 5A:
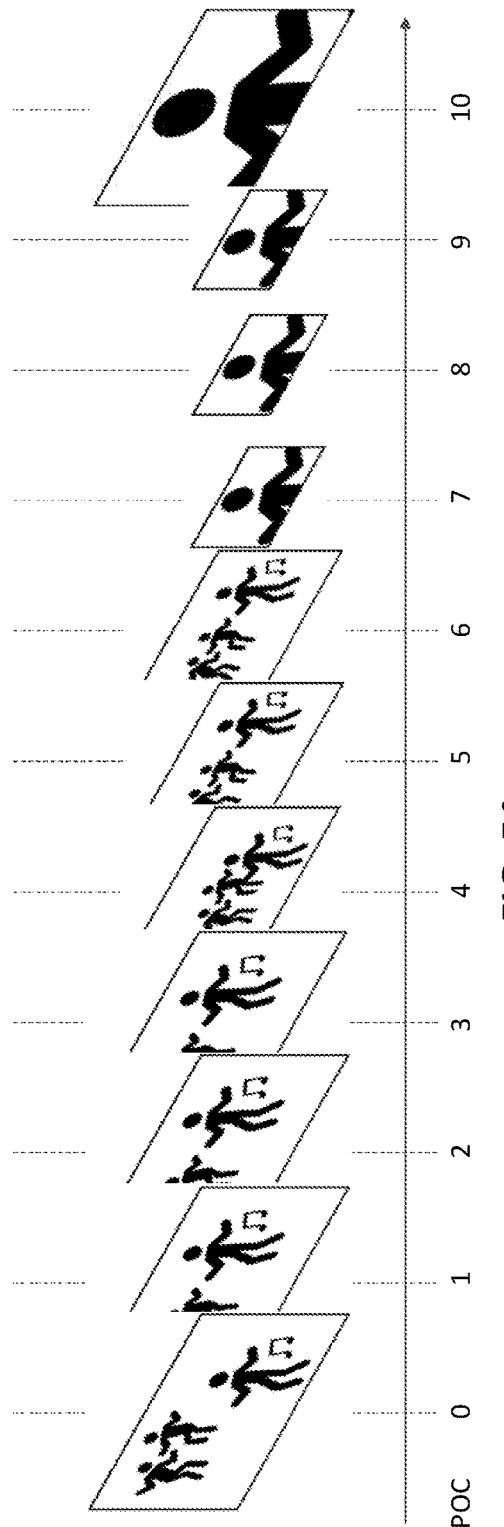
FIG. 5A and FIG. 5B depict an example of single layer/loop decoding within an RPR framework with support for ROI, which can be used for scalable and non-scalable bitstream, according to an embodiment of this invention.
Figure 5B:
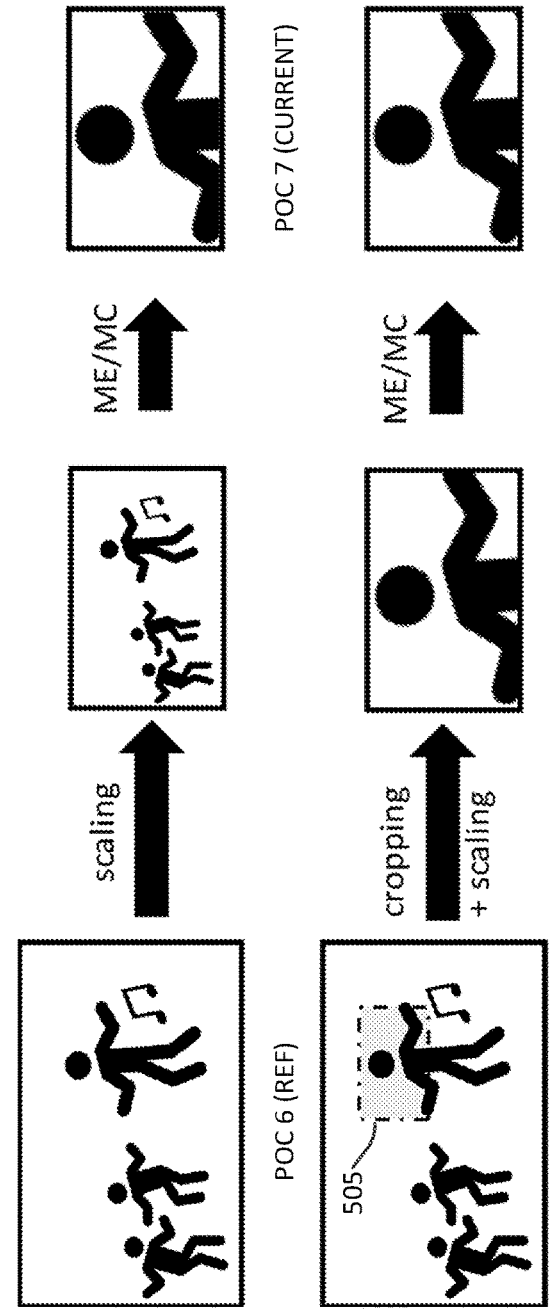

FIG. 5A and FIG. 5B depict another example where support for single-layer bitstream with and without ROI may be desired. FIG. 5A depicts a low-delay coded bitstream, where each frame uses the previous frame as reference for motion estimation and compensation (ME/MC). Each picture is characterized by a picture order count (POC). Without loss of generality, as an example, pictures with POC 0-3 are coded with 1920×1080p spatial resolution. Pictures with POC4-6 are coded with a 1280×720p spatial resolution, pictures with POC 7-9 are coded with a 960×540*p* resolution, and picture with POC=10 is coded with a 1920×1080p resolution. For POC4, its reference picture (POC3) needs to use RPR in down-sampling mode to virtually generate a reference picture during motion compensation for proper prediction. For POC10, its reference picture (POC9) needs to use RPR in up-sampling mode to virtually generate a proper reference picture for proper prediction during motion compensation. However, the transition from POC6 to POC7 includes both resolution change and ROI cropping which, as depicted in the top row of FIG. 5B, it cannot be handled correctly and efficiently with scaling alone in the current RPR design. FIG. 5B, first row, shows how the scaling ratio is computed using the current RPR framework. Since RPR is only based on effective picture resolution, POC7 has a smaller resolution than POC6, thus, for POC7, it will assume its reference picture (POC6) needs to use RPR in down-sampling mode to generate a proper reference picture. But POC7 is actually an up-sampled version of a cropped ROI window in POC6. Therefore, the reference picture POC6 generation is not correct. As depicted in FIG. 5B (second row), to properly generate a reference picture for POC7, one needs to a) select a proper ROI (e.g., ROI 505), and then scale that ROI to match the spatial resolution of POC7.

Figure 6A:
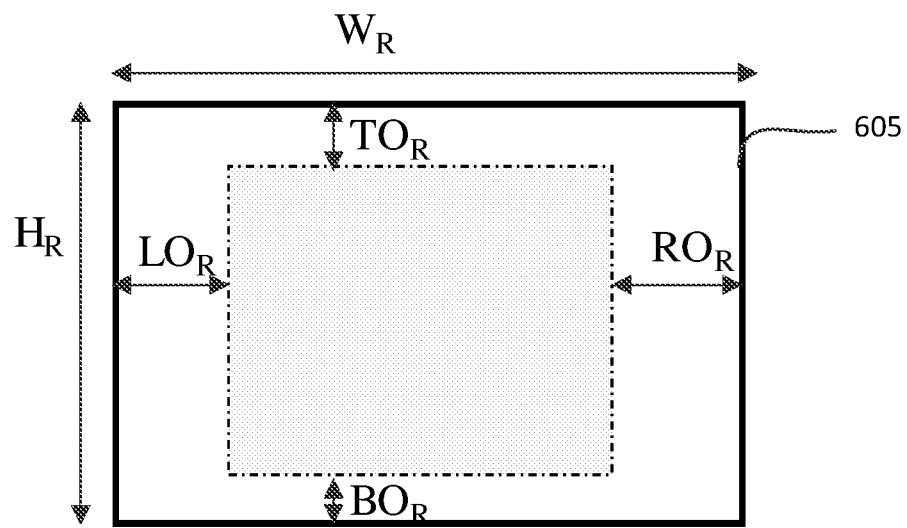
FIG. 6A depicts ROI parameters for a current picture and a reference picture according to an embodiment of this invention.
Figure 6A:
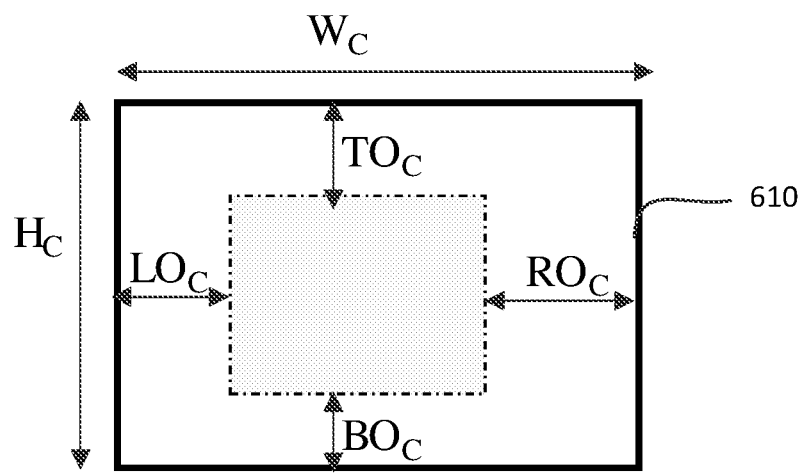

In an embodiment, instead of using the whole picture size, it is proposed to adjust the RPR scaling ratio according to a specified ROI area. An ROI window is specified by four parameters: leftOffset (LO), rightOffset (RO), topOffset (TO) and botOffset (BO). As shown in FIG. 6, a set of $(LO_R, RO_R, TO_R, BO_R)$ values is present in a reference picture (605), and a set of $(LO_C, RO_C, TO_C, BO_C)$ values is present in the current picture (610). In the current RPR design, without ROI, the horizontal and vertical scaling ratios are calculated as:

$$\text{scaling\_hor} = W_R/W_C, \text{scaling\_ver} = H_R/H_C, \quad (1)$$

where $W_R$ and $W_C$ denote the width of the reference and the current picture, and $H_R$ and $H_C$ denote the height of the reference and the current picture. With ROI window support, in an embodiment, the scaling ratio calculation is modified as:

$$\text{scaling\_hor} = (W_R - LO_R - RO_R)/(W_C - LO_C - RO_C) \text{ scaling\_ver} = (H_R - TO_R - BO_R)/(H_C - TO_C - BO_C) \quad (2).$$

When the four ROI parameters $(LO_R, RO_R, TO_R, BO_R)$ in the reference picture are equal to 0, the whole reference picture corresponds to an ROI on the current picture. When the four ROI parameters $(LO_C, RO_C, TO_C, BO_C)$ in the current picture are equal to 0, the ROI area on the reference picture corresponds to the whole current picture; when both $(LO_R, RO_R, TO_R, BO_R)$ and $(LO_C, RO_C, TO_C, BO_C)$ are equal to 0, then the mapping problem is reduced to the default RPR case.

Multiple reference pictures can be used for coding the current picture. Furthermore, different ROI offsets may present in different reference pictures of the same current picture. These different ROI window offset parameters can be signaled in a list using a high-level syntax, such as a sequence parameter set (SPS), a picture parameter set (PPS), an adaptation parameter set (APS), or any other high level syntax. If an ROI window does not change frequently, it is better to indicate its syntax in SPS; otherwise, it is better to indicate its syntax in APS. Table 1 depicts, without limitation, an example syntax signaled in SPS, based on the existing SPS syntax in Ref. [2] (Section 7.3.2.3). New syntax elements over Ref.[2] are depicted in an Italic font. To save the number of overhead bits compared to the existing scaling window and conformance window offsets, a new parameter roi_offset_prec_shift is added so that the ROI window offsets parameters will be right shifted first by the value of roi_offset_prec_shift, before being encoded. This allows for using fewer bits for coding than coding the offsets parameters directly; however, this shifting is optional and can be removed, and in another embodiment the ROI offsets can be coded directly.

TABLE 1

Example ROI syntax at the sequence level

| | Descriptor |
|---|---|
| seq_parameter_set_rbsp( ) { | |
| ... | |
|   if( ref_pic_resamplmg_enabled_flag ) { | |
|     *sps_rpr_roi_window_present_flag* | *u(1)* |
|     *if( sps_rpr_roi_window_present_flag ) {* | |
|       *num_roi_window_list_minus1* | *ue(v)* |
|       *for( i = 0; i <=* | |
|       *num_roi_window_list_minus1; i ++ ) {* | |
|         *roi_offset_prec_shift[ i ]* | *ue(v)* |
|         *roi_offset_list[ i ][0] /\*left    \*/* | *ue(v)* |
|         *roi_offset_list[ i ][1] /\*right  \*/* | *ue(v)* |
|         *roi_offset_list[ i ][2] /\*top     \*/* | *ue(v)* |
|         *roi_offset_list[ i ][3] /\*bottom \*/* | *ue(v)* |
|       } | |
|     } | |
|   } | |
| } | |

ROI Semantic elements for SPS sps_rpr_roi_window_present_flag equal to 1 indicates that the lists of the reference picture resampling ROI window offset parameters follow next in the SPS. sps_rpr_roi_window_present_flag equal to 0 indicates that the lists of the reference picture resampling ROI window offset parameters are not present in the SPS. When not present, the value of sps_rpr_roi_window_present_flag is inferred to be equal to 0.

num_roi_window_list_minus1 plus 1 specifies the number of roi_offset_list syntax elements that are present in the SPS. The value of num_roi_window_list_minus1 shall be in the range of 0 to 15, inclusive. When not present, the value of num_roi_window_list_minus1 is inferred to be 0.

roi_offset_prec_shift[i] specifies the left shift bit to the i-th roi_offset_list syntax elements. The value of roi_offset_prec_shift[i] shall be in the range of 0 to 7, inclusive. When not present, the value of roi_offset_prec_shift[i] is inferred to be 0.

roi_offset_list[i][j] left shifted by roi_offset_prec_shift[i] specifies the reference picture resampling ROI window offsets of the i-th roi_offset_list, in units of luma samples, which are applied for scaling ratio calculations, where j equals to 0 indicates the left offset, j equal to 1 indicates the right offset, j equal to 2 indicates the top offset, and j equals to 3 indicates the bottom offset. When no present, the values of roi_offset_list[i][j] are inferred to be 0. The values of roi_offset_list[i][0] and roi_offset_list[i][1] shall be multiple of SubWidthC and the values of roi_offset_list[i][2] and roi_offset_list[i][3] shall be multiple of SubHeightC. The variable RoiOffsetList[i][j] is set equal to (roi_offset_list[i][j]<<roi_offset_prec_shift[i]). The value of (RoiOffsetList[i][0]+RoiOffsetList[i][1]) shall be less than pic_width_in_luma_samples of the picture that the ROI window is associated with, and the value of (RoiOffsetList[i][2]+RoiOffsetList [i][3]) shall be less than pic_height_in_luma_samples of the picture that the ROI window is associated with.

In an embodiment, the exact ROI window used for each reference picture in the RPL (reference picture list) of the current coding slice can be specified at the slice header or other places where the reference picture list info is available. It can even be specified in the picture header too. Signaling in the slice header gives better flexibility because it needs to follow the exact reference picture signaling for each slice. Table 2 depicts an example of ROI signaling in the slice headers (see Ref.[2], syntax in 7.3.7.1).

TABLE 2

Example ROI syntax at the slice level

| | Descriptor |
|---|---|
| slice_header( ) { | |
| ... | |
| if( slice_type != I && | |
| sps_rpr_roi_window_present_flag ) { | |
|   slice_rpr_roi_window_enabled_flag | u(1) |
|   if( slice_rpr_roi_window_enabled_flag ) { | |
|     for( i = 0; i < slice_type = = B ? 2: 1; i ++ ) { | |
|       for( j = 0; j < num_ref_entries[ i ] | |
|       [ RplsIdx[ i ] ]; j ++ ) { | |
|         curr_roi_window_present_flag[ i ][ j ] | u(1) |
|         if( curr_roi_window_present_flag[ i ][ j ] ) | |
|           curr_roi_offset_idx[ i ][ j ] | u(v) |
|         ref_roi_window_present_flag[ i ][ j ] | u(1) |
|         if( ref_roi_window_present_flag[ i ][ j ] ) | |
|           ref_roi_offset_idx[ i ][ j ] | u(v) |
|       } | |
|     } | |
|   } | |
| } | |

ROI Semantic elements for SPS slice_rpr_roi_window_enabled_flag equal to 1 specifies that the ROI window offset parameters may be used for the scaling ratio calculations. slice_rpr_roi_window_enabled_flag equal to 0 specifies that the ROI window offset parameters may not be used for the scaling ratio calculations. When not present, the value of slice_rpr_roi_window_enabled_flag is inferred to be equal to 0.

curr_roi_window_present_flag[i][j] equal to 1 specifies that a set of ROI window offset parameters is used in the current picture to derive the scaling ratio for the j-th entry of the i-th reference picture list. curr_roi_window_present_flag [i][j] equal to 0 specifies that a set of ROI window offset parameters is not used in the current picture to derive the scaling ratio for the j-th entry of the i-th reference picture list.

curr_roi_offset_idx[i][j], when present, specifies which set of ROI window offset parameters in the array roi_offset_list is used in the current picture to derive the scaling ratio for the j-th entry of the i-th reference picture list. The value of curr_roi_offset_idx[i][j] shall be in the range of 0 to num_roi_window_list_minus1, inclusive. The length of the syntax element is Ceil(Log2(num_roi_window_list_minus1+1)) bits.

ref_roi_window_present_flag[i][j] equal to 1 specifies that a set of ROI window offset parameters is used in the reference picture to derive the scaling ratio for the j-th entry of the i-th reference picture list. ref_roi_window_present_flag[i][j] equal to 0 specifies that a set of ROI window offset parameters is not used in the reference picture to derive the scaling ratio for the j-th entry of the i-th reference picture list.

ref_roi_offset_idx[i][j], when present, specifies which set of ROI window offset parameters in the array roi_offset_list is used in the reference picture to derive the scaling ratio for the j-th entry of the i-th reference picture list. The value of ref_roi_offset_idx[i][j] shall be in the range of 0 to num_roi_window_list_minus1, inclusive. The length of the syntax element is Ceil(Log2(num_roi_window_list_minus1+1)) bits.

In the current VVC version, RPR is applied only when the scaling ratios in equation (1) are not both equal to 1 (e.g., the reference and the current picture have different sizes). When ROI is enabled, RPR could be activated even when both scaling ratios are equal to 1. To support ROI when scaling ratios equal to 1.0, one would also need to add a condition to check whether the current ROI window and reference ROI window have the same resolution. If they don't have the same resolution, then ROI offsets need to be taken into consideration during the motion compensation process.

In Ref. [2], the RPR condition to check if special handling is needed for a reference picture is given by:

$$\text{RefPicIsScaled} = (\text{scale\_hor}! = 1) \| (\text{scale\_ver}! = 1).$$

In an embodiment supporting ROI, in an example, the test above can be adjusted as:

$$\text{RefPicIsScaled} = (\text{scale\_hor}! = 1) \| (\text{scale\_ver}! = 1) \| \\ (\text{fCurrPicWidth} != \text{fRefPicWidth}) \| (\text{fCurrPicHeight} != \text{fRefPicHeight}), \quad (3)$$

where fCurrPicWidth and fCurrPicHeight denote the width and height of the current picture, and fRefPicWidth and fRefPicHeight denote the width and height of the reference picture.

Figure 6B:
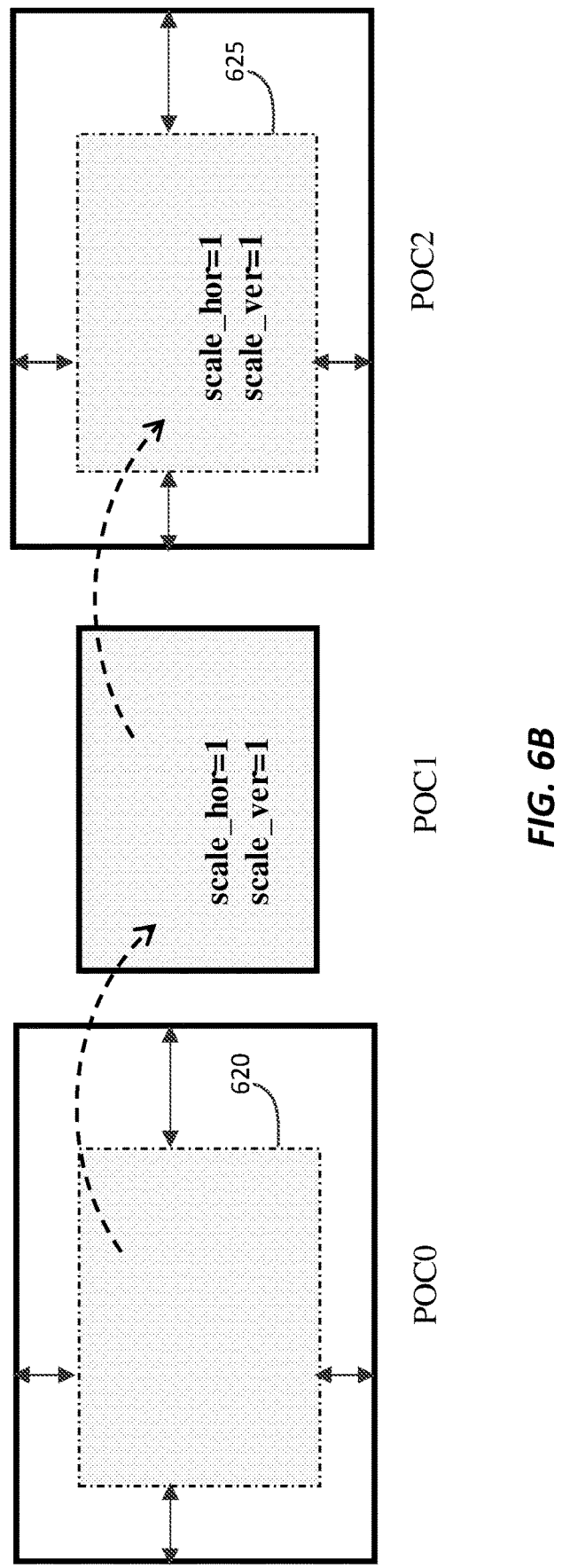
FIG. 6B depicts scaling ratio equal to 1 within an RPR framework with ROI support according to an embodiment of this invention.

FIG. 6B depicts an example where ROI offsets need to be considered with scaling ratio equal to 1. For example, as depicted in FIG. 6B, pictures PIC0 and PIC1 have different resolutions; however, picture POC1 uses as a reference ROI 620. Assuming that ROI 620 has the same spatial resolution as picture POC1, no scaling will be required, but motion compensation in POC1 needs to take into consideration the ROI offsets in reference picture POC0. Picture POC2 has a different spatial resolution than picture POC1; however, when computing the reference picture for ROI 625, if ROI 625 has the same spatial resolution as POC1, then no scaling will be required, but motion compensation in POC2 needs to take into consideration the ROI offset in the current picture POC2.

Appendix 1 provides examples on how the current VVC specification can be updated to support ROIs within the RPR framework. The updates on scaling ratio computation and scaled condition for each reference picture in each list are specified in Section 8.3.2 (Decoding process for reference picture lists construction), which includes equations (2) and (3). Updates on motion compensation or inter prediction are specified in Section 8.5.6.3.1 (Fractional sample interpolation process: General subsection), which replaces scaling_win_left_offset and scaling_win_top_offset with correct left offset (fCurrLeftOffset) and top offset (fCurrTopOffset) for the current picture. The key aspect is that the offset parameters need to be updated with the actual ROI parameters. Other changes to the existing decoding process are minimal. As before, examples of the proposed changes are depicted using an Italic font.

Figure 7:
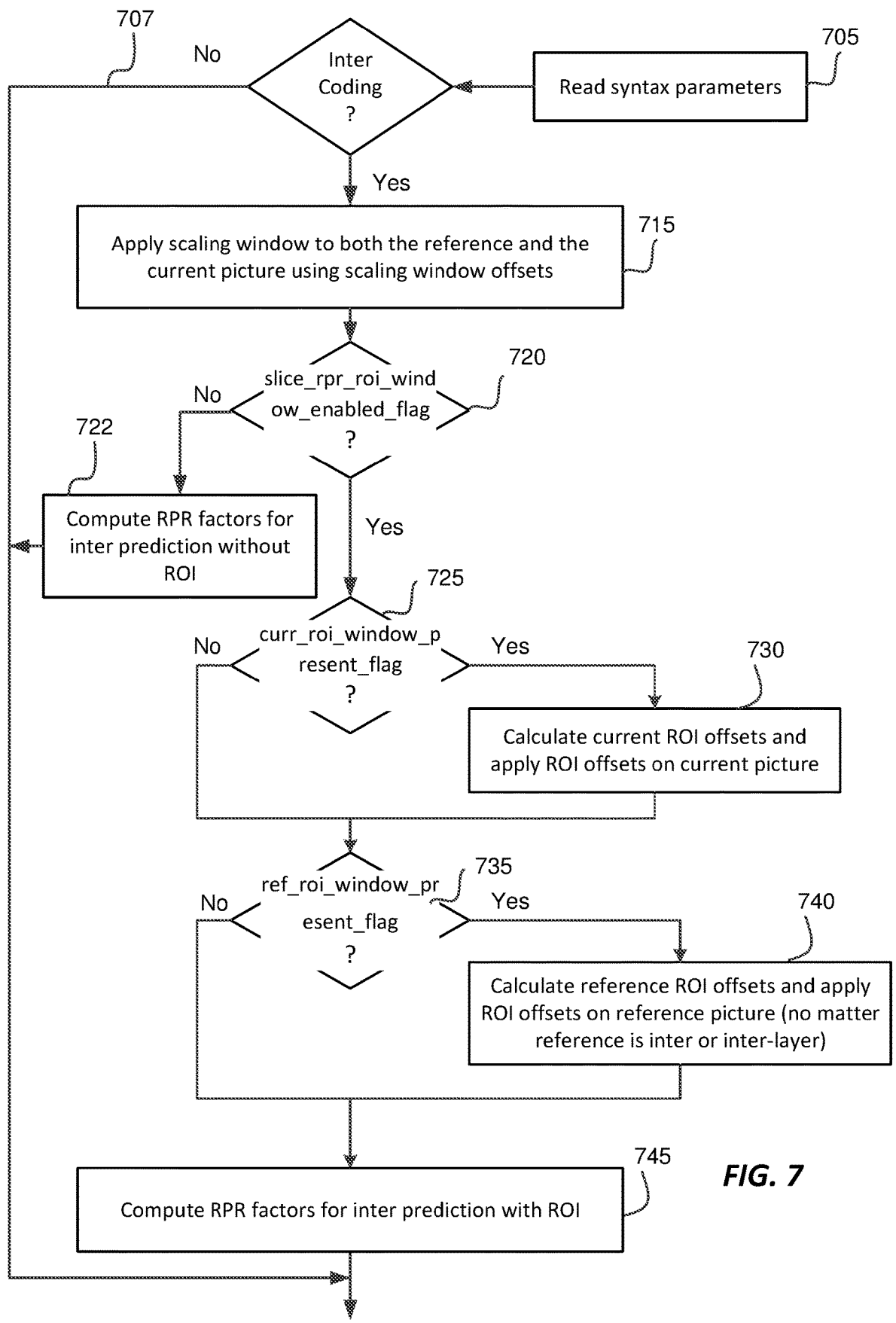
FIG. 7 depicts an example process flow supporting ROI in RPR for each reference picture according to an embodiment of this invention.

FIG. 7 depicts an example dataflow of operations supporting reference picture resampling with support for ROI according to an embodiment. As an example, and without limitation, the data flow will be described with reference to the syntax parameters as described in Tables 1 and 2 and the operations described using Italics in Appendix 1 for each reference picture.

As depicted in FIG. 7, in step 705, a decoder receives and reads syntax parameters from a coded bitstream. The syntax parameters may include scaling window offsets, ROI window present flag and related offsets for a reference picture, and ROI window present flag and offsets for the current picture. If in Intra coding mode (707), the whole process is bypassed, otherwise (step 715), the decoder initializes offset parameters according to the default VVC syntax, which, if needed, may be overwritten later on.

In step 720, if slice_rpr_roi_window_enabled_flag=0 (see Table 2 or Section 7.3.7.1 in Appendix 1), then no ROI-related computations are needed at the slice level and the decoder can continue (in step 722) to compute picture-wide scaling factors using the current version of VVC (Ref. [2]) (e.g., see equation (1)), with the offset parameters computed in step 715. Otherwise, in step 725, as noted also in Table 2, the decoder checks the value of the curr_roi_window_present_flag to determine whether the current picture uses a set of ROI window offsets (e.g., 610). If it does, in step 730, it reads the offsets determining the ROI window in the current picture (e.g., by reading a pointer (e.g., curr_roi_offset_idx) to an array roi_offset_list[i][j], j=0, 1, 2, and 3, as defined in Table 1 (or Section 7.3.2.3 in Appendix 1). Next (step 735), the decoder checks the value of the ref_roi_window_present_flag to determine whether the reference picture uses a set of ROI window offsets (e.g., 605) to determine RPR scaling parameters. If it does, in step 740, it reads the offsets determining the ROI window in the reference picture (e.g., by reading a pointer (e.g., ref_roi_offset_idx) to the array roi_offset_list[i][j], j=0, 1, 2, and 3, as defined in Table 1 (or Section 7.3.2.3 in Appendix 1). Given all these offsets, in step 745, appropriate scaling factors are computed (e.g., see equation (2) and/or operations in Appendix 1).

The current version of VVC (Ref. [2]) supports multi-layer scalability using the RPR framework, where the base layer is used as the long-term reference picture (LTRP) for an enhancement layer. As presented herein, the proposed solutions to support ROI within the RPR framework in a single layer are applicable to multi-layer scalability as well Support of ROI Scalability in the Picture Header (PH)

In another set of embodiments, a region of interest (ROI) window may be signaled in the picture header (PH) to override a scaling window which may be defined as part of the semantics in the Picture Parameter Set (PPS). Additional syntax parameters are used to denote whether the ROI scaling window is used in the current picture or the reference picture. Under such embodiments, instead of signaling multiple, but fixed, ROI windows in the sequence parameter set (SPS), there is a single, but variable-size, ROI window in each PH. Note that in Ref. [5], a "picture header" is denoted as a "syntax structure containing syntax elements that apply to all slices of a coded picture."

In an embodiment, in the slice header, for each active reference picture, it is signaled if the PH-scaling window is used or not for a pair of a current picture and a reference picture, and if used, if they override the current picture scaling window or the current reference picture scaling window. Compared to signaling the ROI scaling windows in the SPS, signaling in the PH allows for more flexibility. In addition, the proposed new designs minimize the number of proposed changes in the latest VVC working-draft specification (Draft 8) (Ref. [5]).

In this disclosure four different embodiments of the invention are proposed. The first one will be discussed in full detail. The others will be discussed in comparison to the first one.

First Variation (Absolute Window Offsets)

In the First variation, the PH scaling window is signaled using absolute offsets (e.g., see FIG. 6A), which override directly the scaling window. Tables 3 and 4 below correspond to Table 7.3.7.1 (Picture header structure syntax) and Table 7.3.7.1 (General slice header syntax) in Ref. [5]. As before, edits are in Italics. A more detailed syntax, semantics, and the decoding process are also described in Appendix 2.

TABLE 3

Example of ROI support in the Picture Header

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   ...... | |
|   *if( ph_inter_slice_allowed_flag ) {* | |
|     ...... | |
|     *if( res_change_in_clvs_allowed_flag ) {* | |
|       *ph_scaling_window_present_flag* | *u(1)* |
|       *if( ph_scaling_window_present_flag ) {* | |
|         *ph_scaling_win_offset_prec_shift* | *ue(v)* |
|         *ph_scaling_win_left_offset* | *ue(v)* |
|         *ph_scaling_win_right_offset* | *ue(v)* |
|         *ph_scaling_win_top_offset* | *ue(v)* |
|         *ph_scaling_win_bottom_offset* | *ue(v)* |
|       } | |
|     } | |
|   } | |
|   ...... | |
| } | | ph_scaling_window_present_flag equal to 1 specifies that the scaling window offset parameters are present in the PH and may be applied for the scaling ratio calculation for all slices associated with the PH. ph_scaling_window_present_present_flag equal to 0 specifies that the scaling window offset parameters are not present in the PH. When not present, the value of ph_scaling_window_present_flag is inferred to be equal to 0.

ph_scaling_win_offset_offset_prec_shift specifies the number of bits by which a left shift is performed for the calculation of the scaling window offsets. The value of ph_scaling_win_offset_prec_shift shall be in the range of 0 to 7, inclusive.

Note that the ph_scaling_win_offset_offset_prec_shift syntax element is used only to save bandwidth (by reducing the number of transmitted bits) and is optional. In other embodiments, there would be no shift, or a predetermined shift, known by both an encoder and the decoder.

ph_scaling_win_left_offset, ph_scaling_win_right_offset, ph_scaling_win_top_offset, and ph_scaling_win_bottom_offset specify the offsets that are applied to the picture size for scaling ratio calculation. When not present, the values of ph_scaling_win_left_offset, ph_scaling_win_right_offset, ph_scaling_win_top_offset, and ph_scaling_win_bottom_offset are inferred to be equal to 0.

The variables PhScalingWinLeftOffset, PhScalingWinRightOffset, PhScalingWinTopOffset, and PhScalingWinBottomOffset, ares set equal to SubWidthC*(ph_scaling_win_left_offset<<ph_scaling_win_offset_prec_shift), SubWidthC*(ph_scaling_win_right_offset<<ph_scaling_win_offset_prec_shift), SubHeightC*(ph_scaling_win_top_offset<<ph_scaling_win_offset_prec_shift), and SubHeightC*(ph_scaling_win_bottom_offset<<ph_scaling_win_offset_prec_shift), respectively.

The value of (PhScalingWinLeftOffset+PhScalingWinRightOffset) shall be less than pic_width_luma_samples of the picture which applies the scaling window in the PH. The value of (PhScalingWinTopOffset+PicScalingWinBottomOffset) shall be less than pic_height_in_luma_samples of the picture which applies the scaling window in the PH.

The value of PhScalingWinLeftOffset shall be greater than or equal to SubWidthC*scaling_win_left_offset of the picture which applies the scaling window in the PH.

The value of PhScalingWinRightOffset shall be greater than or equal to SubWidthC*scaling_win_right_offset of the picture which applies the scaling window in the PH.

The value of PhScalingWinTopOffset shall be greater than or equal to SubHeightC*scaling_win_top_offset of the picture which applies the scaling window in the PH.

The value of PhScalingWinBottomOffset shall be greater than or equal to SubHeightC*scaling_win_bottom_offset of the picture which applies the scaling window in the PH.

Note: In this variation, with absolute offsets, the offsets need to be defined so that the ROI window is equal or smaller than the PPS scaling window. This constraint can be removed when defining delta offsets, as in the Second and Fourth variations to be discussed later.

TABLE 4

Example of Slice Header Syntax with ROI support

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   ...... | |

TABLE 4-continued

Example of Slice Header Syntax with ROI support

| | Descriptor |
|---|---|
|   if( slice_type != I ) { | |
|     if( ph_scaling_window_present_flag ) | |
|       for( i = 0; i < slice_type = = B ? 2 : 1; i ++ ) | |
|         for( j = 0; j < NumRefIdxActive[ i ]; j ++ ) | |
|           slice_scaling_win_idc[ i ][ j ] /*0:not present,1: present in ref; 2:present in current */ | u(2) or ue(v) |
|   ...... | |
|   } | |
|   ...... | |
| } | | slice_scaling_win_idc[i][j] equal to 0 specifies the scaling window offsets in PH is not used for scaling ratio calculation for the j-th entry in reference picture list i of the current slice. slice_scaling_win_idc[i][j] equal to 1 specifies the scaling window offsets in PH is used to override the offsets of the reference picture for scaling ratio calculation for the j-th entry in reference picture list i of the current slice. slice_scaling_win_idc[i][j] equal to 2 specifies the scaling window offsets in PH is used to override the offsets of the current picture for scaling ratio calculation for the j-th entry in reference picture list i of the current slice.

It is a requirement of bitstream conformance that for any active entry in a reference picture list for all slices of the current picture, which refers to the same reference picture, the value of slice_scaling_win_idc[i][j] shall be the same.

Figure 8A:
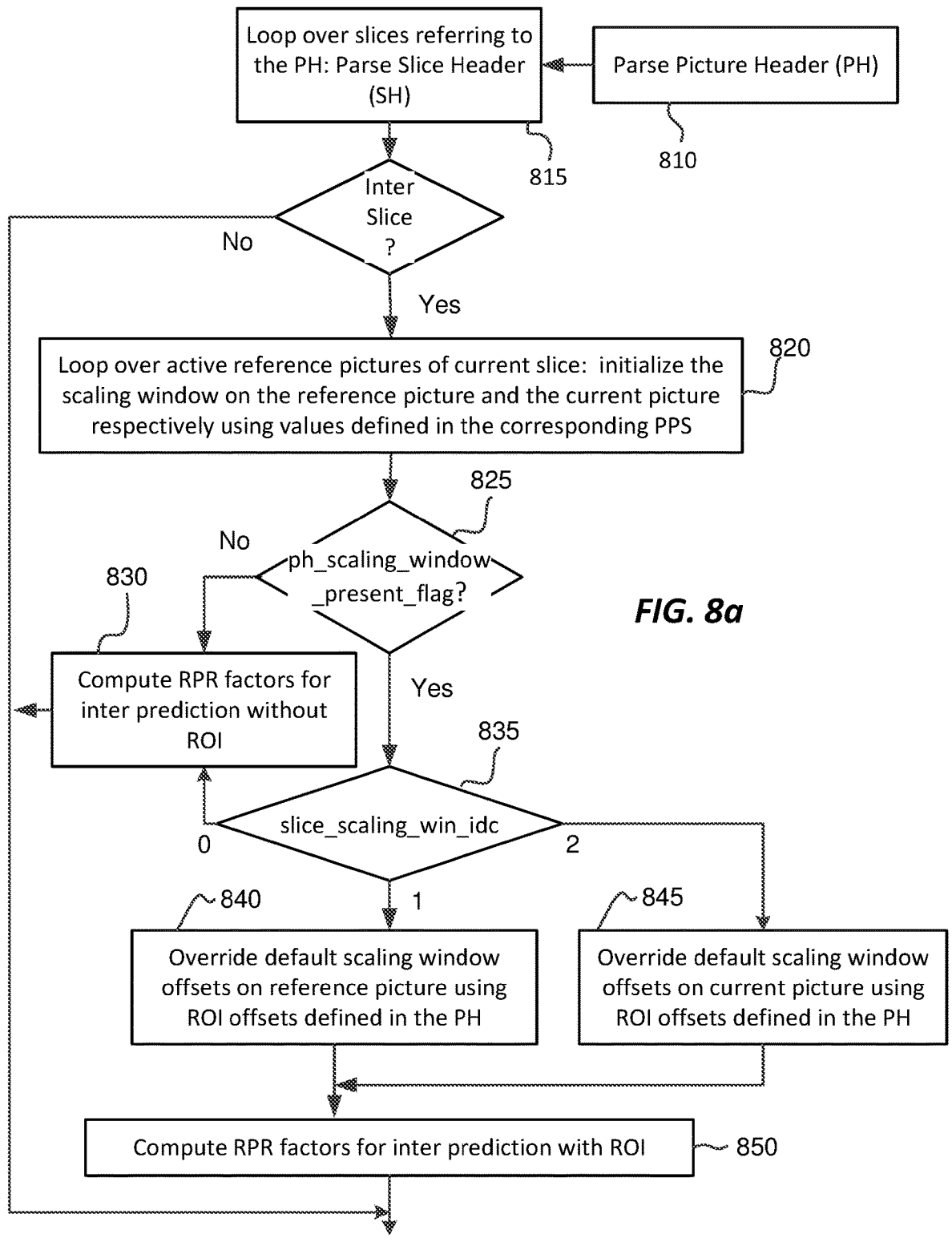
FIG. 8a-FIG. 8d depict example process flows for supporting an ROI window in the picture header according to an embodiment of this invention.

FIG. 8a depicts an example process flow for the First variation. As depicted in FIG. 8a, during decoding, in step 810, the decoder needs to parse the Picture Header (PH). As noted in step 815, the follow-up steps (e.g., 820-850) are repeated over all slices in the reference pictures referred to by the PH. For Intra slices, there is no picture scaling or ROI-related processing and decoding proceeds as defined in VVC. For Inter slices, as noted in step 820, the decoder repeats the follow-up steps (e.g., 825-850) over all active reference pictures, thus, for each reference picture, first, it initializes the scaling windows using syntax elements defined in the corresponding PPS of the current picture and the reference picture. Next, in step 825, the decoder checks if an ROI-related flag (e.g., ph_scaling_window_present_flag) is set. If not, decoding proceeds as in the existing (with no ROI) decoding process (step 830), otherwise, in step 835 for each slice in the reference picture, the decoder checks an ROI-related parameter (e.g., slice_scaling_win_idc). If that parameter is 0, again, no ROI-related processing is performed (step 830), otherwise, depending on its value (e.g., 1 or 2), the decoder overrides the scaling window offsets in either the reference frame (step 840) or the current frame (step 845). Finally, in step 850, the decoder proceeds to compute the RPR factors for inter prediction taking into account the ROI syntax parameters decoded earlier.

As shown below and in Appendix 2, given the above parameters, the existing VVC decoding process needs to be modified as noted below. Again, section numbers refer to sections in the VVC specification, and the proposed edits are in Italics.

8.3.2 Decoding Process for Reference Picture Lists Construction

This process is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified in clause 8.3.3 or in decoding of the slice data.

NOTE 1— For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList [1], the reference picture scaling ratios RefPicScale[i][j][0] and RefPicScale[i][j][1], the reference picture scaled flags RprConstraintsActive[0][j] and RprConstraintsActive[1][j], and the reference picture resampling offsets RefRprLeftOffset[i][j], RefRprTopOffset[i][j], CurrRprLeftOffset[i][j], CurrRprTopOffset[i][j], are derived as follows:

```
- for( i = 0; i < 2; i++ ) {
   for( j = 0, k = 0, pocBase = PicOrderCntVal; j < num_ref_entries[ i ][ RplsIdx[ i ] ]; j++)
  {
  ......
    fRefWidth is set equal to PicOutputWidthL of the reference picture RefPicList[ i ][ j ]
    fRefHeight is set equal to PicOutputHeightL of the reference picture RefPicList[ i ][ j ]
    fCurrWidth = PicOutputWidthL
    fCurrHeight = PicOutputHeightL
    refPicWidth, refPicHeight, refScalingWinLeftOffset, refScalingWinRightOffset,
refScalingWinTopOffset,
        and refScalingWinBottomOffset, are set equal to the values of
pic_width_in_luma_samples,
        pic_height_in_luma_samples, scaling_win_left_offset, scaling_win_right_offset,
        scaling_win_top_offset, and scaling_win_bottom_offset, respectively, of the
reference picture  RefPicList[ i ][ j ]
//Note - Start of initialization step 820
    RefRprLeftOffset[ i ][ j ] = subWidthC * refScalingWinLeftOffset
    RefRprTopOffset[ i ][ j ] = subHeightC * refScalingWinTopOffset
    CurrRprLeftOffset[ i ][ j ] = subWidthC * scaling_win_left_offset
    CurrRprTopOffset[ i ][ j ] = subHeightC * scaling_win_top_offset
// Step 825
    if( ph_scaling_window_present_flag && slice_scaling_win_idc [ i ][ j ] != 0)
    {
// Step 835
      if (slice_scaling_win_idc[ i ][ j ]==1 ) {
// Step 840
      fRefWidth = refPicWidth − (PhScalingWinLeftOffset + PhScalingRightWinOffset)
      fRefHeight = refPicHeight − (PhScalingWinTopOffset + PhScalingWinBottomOffset
)
      RefRprLeftOffset[ i ][ j ] = PhScalingWinLeftOffset
      RefRprTopOffset[ i ][ j ] = PhScalingWinTopOffset
    }
//Step 845
      else if( slice_scaling_win_idc[ i ][ j ]==2 ) {
      fCurrWidth = pic_width_in_luma_samples − (PhScalingWinLeftOffset +
PhScalingWinRightOffset)
      fCurrHeight = pic_height_in_luma_samples − (PhScalingWinTopOffset +
PhScalingBottom WinOffset)
      CurrRprLeftOffset[ i ][ j ] = PhScalingWinLeftOffset
      CurrRprTopOffset[ i ][ j ] = PhScalingWinTopOffset
      }
    }
// Step 850
    RefPicScale[ i ][ j ][ 0 ] = ( ( fRefWidth << 14 ) + ( fCurrWidth >> 1 ) ) / fCurrWidth
    RefPicScale[ i ][ j ][ 1 ] = ( ( fRefHeight << 14 ) + ( fCurrHeight
>> 1 ) ) / fCurrHeight
    RprConstraintsActive[ i ][ j ] = ( pic_width_in_luma_samples != refPicWidth | |
      pic_height_in_luma_samples != refPicHeight | |
      CurrRprLeftOffset [ i ][ j ] != RefRprLeftOffset [ i ][ j ] | |
      CurrRprTopOffset[ i ][ j ] != RefRprTopOffset[ i ][ j ] | |
      fCurrWidth != fRefWidth | |
      fCurrHeight != fRefHeight )
    }
}
```

When RprConstraintsActive [ i ] [ j ] is equal to 1, the following constraints apply:
RefPicScale [ i ] [ j ] [ 1 ] shall be less than or equal to $2^{15}$.
RefPicScale [ i ] [ j ] [ 1 ] shall be greater than or equal to $2^{11}$.
RefPicScale [ i ] [ j ] [ 1 ] shall be less than or equal to $2^{15}$.
RefPicScale [ i ] [ j ] [ 1 ] 1 shall be greater than or equal to $2^{11}$.

8.5.6.3.1 General

Inputs to this process are:
- a luma location (xSb, ySb) specifying the top-left sample of the current coding subblock relative to the top-left luma sample of the current picture,
- a variable sbWidth specifying the width of the current coding subblock,
- a variable sbHeight specifying the height of the current coding subblock,
- a motion vector offset mvOffset,
- a refined motion vector refMvLX,
- the selected reference picture sample array refPicLX, with a value X representing its corresponding reference list and a corresponding reference index refIdxLX,
- the half sample interpolation filter index hpelIfIdx,
- the decoder-side motion vector refinement flag dmvrFlag,
- the bi-directional optical flow flag bdofFlag,
- a variable refPicIsScaled indicating whether the selected reference picture requires scaling,
- a variable cIdx specifying the colour component index of the current block,
- a list of two scaling ratios, horizontal and vertical, scalingRatio, with scalingRatio[0] equal to RefPicScale[X][refIdxLX][0] and scalingRatio[1] equal to RefPicScale[X][refIdxLX][1],
- a list of offsets RefRprLeftOffset[X][refIdxLX], RefRprTopOffset[X][refIdxLX], CurrRprLeftOffset[X][refIdxLX], and CurrRprTopOffset[X][refIdxLX], corresponding to the selected reference picture sample array refPicLX.

Outputs of this process are:
- an (sbWidth+brdExtSize)×(sbHeight+brdExtSize) array predSamplesLX of prediction sample values.

The prediction block border extension size brdExtSize is derived as follows:

brdExtSize=(bdofFlag||(inter_affine_flag[xSb][ySb] && !ph_disable_prof_flag))?2:0  (934)

The variable refWraparoundEnabledFlag is set equal to (pps_ref_wraparound_enabled_flag && !refPicIsScaled).
The variable fRefLeftOffset is set equal to ((RefRprLeftOffset[X][refIdxLX])<<10),
The variable fReflopOffset is set equal to ((RefRprTopOffset[X][refIdxLX])<<10)
The variable fCurrLeftOffset is set equal to CurrRprLeftOffset[X][refIdxLX].
The variable fCurrTopOffset is set equal to CurrRprTopOffset[X][refIdxLX].
The (sbWidth+brdExtSize)×(sbHeight+brdExtSize) array predSamplesLX of prediction sample values is derived as follows:

The motion vector mvLX is set equal to (refMvLX−mvOffset).

If cIdx is equal to 0, the following applies:
Let $(xInt_L, yInt_L)$ be a luma location given in full-sample units and $(xFrac_L, yFrac_L)$ be an offset given in 1/16-sample units. These variables are used only in this clause for specifying fractional-sample locations inside the reference sample arrays refPicLX.
The top-left coordinate of the bounding block for reference sample padding $(xSbInt_L, ySbInt_L)$ is set equal to (xSb+(mvLX[0]>>4), ySb+(mvLX[1]>>4)).
For each luma sample location $(x_L=0 \ldots sbWidth-1+brdExtSize, y_L=0 \ldots sbHeight-1+brdExtSize)$ inside the prediction luma sample array predSamplesLX, the corresponding prediction luma sample value predSamplesLX$[x_L][y_L]$ is derived as follows:

Let $(refxSb_L, refySb_L)$ and $(refx_L, refy_L)$ be luma locations pointed to by a motion vector (refMvLX[0], refMvLX[1]) given in 1/16-sample units. The variables $refxSb_L$, $refx_L$, $refySb_L$, and $refy_L$ are derived as follows:

$refxSb_L=(((xSb-(fCurrLeftOffset))<<4)+refMvLX[0])*scalingRatio[0]$  (935)

$refx_L=((Sign(refxSb_L)*((Abs(refxSb_L)+128)>>8)+x_L*((scalingRatio[0]+8)>>4))+fRefLeftOffset+32)>>6$  (936)

$refySb_L=(((ySb-(fCurrTopOffset))<<4)+refMvLX[1])*scalingRatio[1]$  (937)

$refy_L=((Sign(refySb_L)*((Abs(refySb_L)+128)>>8)+yL*((scalingRatio[1]+8)>>4))+fRefTopOffset+32)>>6$  (938)

The variables $xInt_L$, $yInt_L$, $xFrac_L$ and $yFrac_L$ are derived as follows:

$xInt_L=refx_L>>4$  (939)

$yInt_L=refy_L>>4$  (940)

$xFrac_L=refx_L \& 15$  (941)

$yFrac_L=refy_L \& 15$  (942)

The prediction luma sample value predSamplesLX$[x_L][y_L]$ is derived as follows:
If bdofFlag is equal to TRUE or (ph_disable_prof_flag is equal to FALSE and inter_affine_flag[xSb][ySb] is equal to TRUE), and one or more of the following conditions are true, the prediction luma sample value predSamplesLX$[x_L][y_L]$ is derived by invoking the luma integer sample fetching process as specified in clause 8.5.6.3.3 with $(xInt_L+(xFrac_L>>3)-1)$, $yInt_L+(yFrac_L>>3)-1)$, refPicLX, and refWraparoundEnabledFlag as inputs.
$x_L$ is equal to 0.
$x_L$ is equal to sbWidth+1.
$y_L$ is equal to 0.
$y_L$ is equal to sbHeight+1.
Otherwise, the prediction luma sample value predSamplesLX[xL][yL] is derived by invoking the luma sample 8-tap interpolation filtering process as specified in clause 8.5.6.3.2 with (xIntL−(brdExtSize>0? 1:0), yIntL−(brdExtSize>0? 1:0)), (xFracL, yFracL), (xSbInt$_L$, ySbInt$_L$), refPicLX, hpelIfIdx, sbWidth, sbHeight, dmvrFlag, refWraparoundEnabledFlag, scalingRatio[0], scalingRatio[1], and (xSb, ySb) as inputs.

Otherwise (cIdx is not equal to 0), the following applies:
Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:

Let (refxSb$_C$, refySb$_C$) and (refx$_C$, refy$_C$) be chroma locations pointed to by a motion vector (refMvLX [0], refMvLX[1]) given in 1/32-sample units. The variables refxSb$_C$, refySb$_C$, refx$_C$ and refy$_C$ are derived as follows:

$$addX = \textit{sps\_chroma\_horizontal\_collocated\_flag} ? 0 : 8 * (scalingRatio[0] - (1 \ll 14)) \quad (943)$$

$$addY = \textit{Sps\_Chroma\_Vertical\_Collocated\_Flag} ? 0 : 8 * (scalingRatio[1] - (1 \ll 14)) \quad (944)$$

$$refxSb_C = (((xSb - (fCurrLeftOffset))/SubWidthC \ll 5) + refMvLX[0]) * scalingRatio[0] + addX \quad (945)$$

$$refx_C = ((Sign(refxSb_C) * ((Abs(refxSb_C) + 256) \gg 9) + xC * ((scalingRatio[0] + 8) \gg 4)) + fRefLeftOffset/SubWidthC + 16) \gg 5 \quad (946)$$

$$refySb_C = (((ySb - (fCurrTopOffset))/SubHeightC \ll 5) + refMvLX[1]) * scalingRatio[1] + addY \quad (947)$$

$$refy_C = ((Sign(refySb_C) * ((Abs(refySb_C) + 256) \gg 9) + yC * ((scalingRatio[1] + 8) \gg 4)) + fReff\,opOffset/SubHeightC + 16) \gg 5 \quad (948)$$

The variables xInt$_C$, yInt$_C$, xFrac$_C$ and yFrac$_C$ are derived as follows:

$$xInt_C = refx_C \gg 5 \quad (949)$$

$$yInt_C = refy_C \gg 5 \quad (950)$$

$$xFrac_C = refx_C \,\&\, 31 \quad (951)$$

$$yFrac_C = refy_C \,\&\, 31 \quad (952)$$

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight, refPicLX, dmvrFlag, refWraparoundEnabledFlag, scalingRatio[0], and scalingRatio[1] as inputs.

NOTE—Unlike the process specified in clause 8.4.5.2.13, this process uses both sps_chroma_vertical_collocated_flag and sps_chroma_horizontal_collocated_flag.

Second Variation (Relative window offsets)

Under this embodiment, the scaling window in the Picture Header is signaled with relative offset values (e.g., delta values), which need to be added to the absolute scaling window offset values. By constraining relative offset values to be larger than or equal to 0, one can remove the bitstream conformance requirement in the First variation (see Note before Table 4). The changes, compared to the First variation, are listed below.

Updated syntax semantics to Table 3 ph_scaling_win_left_offset, ph_scaling_win_right_offset, ph_scaling_win_top_offset, and ph_scaling_win_bottom_offset specify the delta value used to derive the PH scaling window offsets that are applied to the picture size for scaling ratio calculation. The offset values shall be larger than or equal to 0. When not present, the values of ph_scaling_win_left_offset, ph_scaling_win_right_offset, ph_scaling_win_top_offset, and ph_scaling_win_bottom_offset are inferred to be equal to 0.

The variables PhScalingWinLeftOffset, PhScalingWinRightOffset, PhScalingWinTopOffset, and PhScalingWinBottomOffset, ares set equal to SubWidthC*(ph_scaling_win_left_offset<<ph_scaling_win_offset_prec_shift), SubWidthC*(ph_scaling_win_right_offset<<ph_scaling_win_offset_prec_shift), SubHeightC*(ph_scaling_win_top_offset<<ph_scaling_win_offset_prec_shift), and SubHeightC*(ph_scaling_win_bottom_offset<<ph_scaling_win_offset_prec_shift), respectively.

The value of (SubWidthC*scaling_win_left_offset+PhScalingWinLeftOffset+SubWidthC *scaling_win_right_offset+PhScalingWinRightOffset) shall be less than pic_width_luma_samples of the picture which applies the scaling window in the PH. The value of (SubHeightC*scaling_win_top_offset+PhScalingWinTopOffset+SubHeightC* scaling_win_bottom_offset+PicScalingWinBottomOffset) shall be less than pic_height_in_luma_samples of the picture which applies the scaling window in the PH.

Figure 8B:
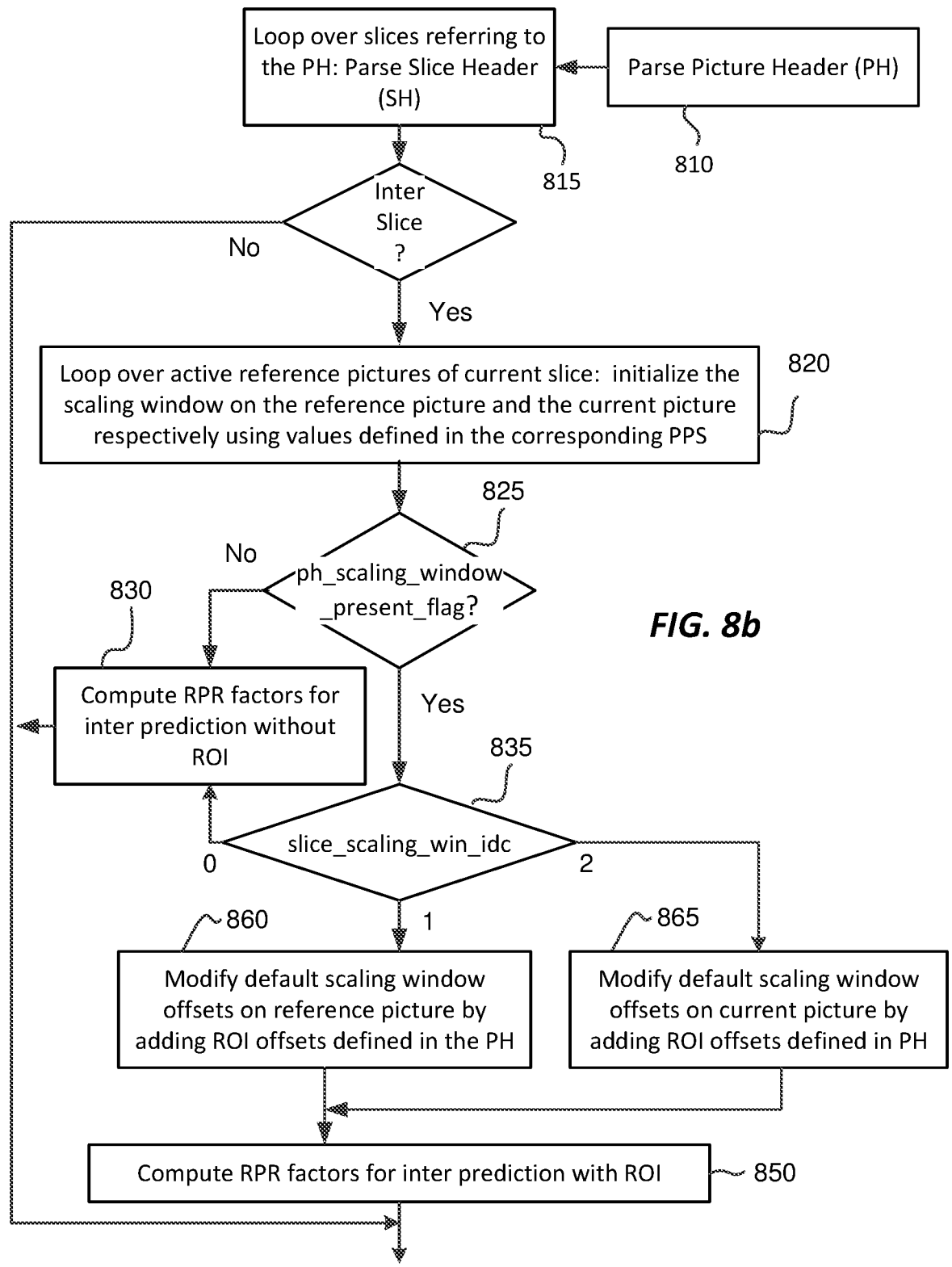

FIG. 8b depicts an example process flow for the Second variation. As depicted in FIG. 8b, compared to the process in FIG. 8a, the only changes are in steps 860 and 865, where the decoder needs to compute the ROI windows using the delta offsets instead of using the absolute offsets, as used in steps 840 and 845 of FIG. 8a.

Compared to the First variation, the decoding process then needs to be modified as follows. Underlined syntax elements denote differences over both the existing VVC version and the First variation.

8.3.2 Decoding process for reference picture lists construction

```
for( i = 0; i < 2; i++ ) {
  for( j = 0, k = 0, pocBase = PicOrderCntVal; j < num_ref_entries[ i ][ RplsIdx[ i ] ];
j++) {
  ......
    fRefWidth is set equal to PicOutputWidthL of the reference picture
RefPicList[ i ][ j ]
    fRefHeight is set equal to PicOutputHeightL of the reference picture
RefPicList[ i ][ j ]
      fCurrWidth = PicOutputWidthL
      fCurrHeight = PicOutputHeightL
      refPicWidth, refPicHeight, refScalingWinLeftOffset, refScalingWinRightOffset,
refScalingWinTopOffset,
        and refScalingWinBottomOffset, are set equal to the values of
pic_width_in_luma_samples,
          pic_height_in_luma_samples, scaling_win_left_offset,
scaling_win_right_offset,
            scaling_win_top_offset, and scaling_win_bottom_offset, respectively, of the
reference picture RefPicList[ i ][ j ]
      RefRprLeftOffset[ i ][ j ] = subWidthC * refScalingWinLeftOffset
      RefRprTopOffset[ i ][ j ] = subHeightC * refScalingWinTopOffset
```

-continued

```
    CurrRprLeftOffset[ i ][ j ] = subWidthC * scaling win left offset
    CurrRprTopOffset[ i ][ j ] = subHeightC * scaling win top offset
    if( ph_scaling_window_present_flag && slice_scaling_win_idc [ i ][ j ] != 0)
    {
        if (slice_scaling_win_idc[ i ][ j ]==1 ) {
// Step 860
            fRefWidth = fRefWidth – (PhScalingWinLeftOffset +
PhScalingRightWinOffset)
            fRefHeight = fRefHeight – (PhScalingWinTopOffset +
PhScalingWinBottomOffset )
            RefRprLeftOffset[ i ][ j ] = RefRprLeftOffset[i][j]+
PhScalingWinLeftOffset
            RefRprTopOffset[ i ][ j ] = RefRprTopOffset[i][j]+
PhScalingWinTopOffset
        }
// Step 865
        else if( slice_scaling_win_idc[ i ][ j ]==2 ) {
            fCurrWidth = fCurrWidth – (PhScalingWinLeftOffset +
PhScalingWinRightOffset)
            fCurrHeight = fCurrHeight – (PhScalingWinTopOffset + PhScaling
Bottom WinOffset)
            CurrRprLeftOffset[ i ][ j ] = CurrRprLeftOffset[i][j] +
PhScalingWinLeftOffset
            CurrRprTopOffset[ i ][ j ] = CurrRprTopOffset[i][j] +
PhScalingWinTopOffset
        }
    }
    RefPicScale[ i ][ j ][ 0 ] = ( ( fRefWidth << 14 ) + ( fCurrWidth
>> 1 ) ) / fCurrWidth
    RefPicScale[ i ][ j ][ 1 ] = ( ( fRefHeight << 14 ) + ( fCurrHeight
>> 1 ) ) / fCurrHeight
    RprConstraintsActive[ i ][ j ] = ( pic_width_in_luma_samples != refPicWidth | |
        pic_height_in_luma_samples != refPicHeight | |
        CurrRprLeftOffset [ i ][ j ] != RefRprLeftOffset [ i ][ j ] | |
        CurrRprTopOffset[ i ][ j ] != RefRprTopOffset[ i ][ j ] | |
        fCurrWidth != fRefWidth | |
        fCurrHeight != fRefHeight )
    }
}
```

Third Variation (Absolute window offsets and ROI override switch)

In this embodiment, compared to the First variation, a new syntax element (e.g., switch ph_scaling_window_present_idc) explicitly specifies if the PH scaling window is used to override the current or the reference picture (see Table 5). For example, without limitation, if its value is 0, then there is no ROI scaling, if its value is 1, then one uses the ROI offsets to override the scaling window in the reference picture, and if its value is 2, then one uses the ROI offsets to override the scaling window in the current picture. In the slice header (see Table 6), another syntax element (e.g., flag slice_scaling_win_flag[i][j]) signals whether ROI scaling is enabled in the slice, and if it does, it uses the value of the ROI switch in the Picture Header signal (e.g., SW=ph_scaling_window_present_idc) (that is, when SW is 1 or 2) to adjust the scaling window either for the reference picture (if SW=1) or the current picture (if SW=2). Compared to the First variation, it saves bits in the slice header, but has less flexibility. For example, this approach uses two bits for ph_scaling_window_present_idc and forces all slices within a PH to override the default scaling window in either the reference picture or the reference picture. Then, at the slice level, a single bit helps identify whether an ROI window is used. Using fewer bits at the slice level, may reduce the bit-overhead when there are multiple reference pictures defined per slice.

TABLE 5

Example PH for ROI support( Third variation)

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   ...... | |
|   if( ph_inter_slice_allowed_flag ) { | |
|     ...... | |
|     if( res_change_in_clvs_allowed_flag ) { | |
|       ph_scaling_window_present_idc | ue( v) or u( 2) |
|       if( ph_scaling_window_present_idc != 0 | |
|       ) { /* 1: in ref. 2: in current */ | |
|         ph_scaling_win_offset_prec_shift | ue( v) |
|         ph_scaling_win_left_offset | ue( v) |
|         ph_scaling_win_right_offset | ue( v) |
|         ph_scaling_win_top_offset | ue( v) |
|         ph_scaling_win_bottom_offset | ue( v) |
|       } | |
|     } | |
|   } | |
|   ...... | |
| } | |

The new syntax element ph_scaling_window_present_idc is defined as:

ph_scaling_window_present_idc equal to 1 specifies that the scaling window offset parameters are present in the PH and may be applied for the scaling ratio calculation for the reference pictures for all slices associated with the PH.

ph_scaling_window_present_idc equal to 2 specifies that the scaling window offset parameters are present in the PH and may be applied for the scaling ratio calculation for the current picture for all slices associated with the PH. ph_scaling_window_present_present_idc equal to 0 specifies that the scaling window offset parameters are not present in the PH. When not present, the value of ph_scaling_window_present_idc is inferred to be equal to 0.

TABLE 6

Example slice header with ROI support (Third variation)

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   ...... | |
|   if( slice_type != I ) { | |
|     if( ph_scaling_window_present_idc ) | |
|       for( i = 0; i < slice_type = = B ? 2 : 1; i ++ ) | |
|         for( j = 0; j < NumRefIdxActive[ i ]; j ++ ) | |
|           slice_scaling_win_flag[ i ][ j ] /*0:not present,1: present */ | u(1) |
|   ...... | |
|   } | |
|   ...... | |
| } | |

The new syntax element slice_scaling_win_flag[i][j] is defined as:

slice_scaling_win_flag[i][j] equal to 0 specifies the scaling window offsets in PH is not used for scaling ratio calculation for the j-th entry in reference picture list i of the current slice. slice_scaling_win_flag[i][j] equal to 1 specifies the scaling window offsets in PH is used to override the offsets of the reference picture when ph_scaling_window_present_idc is equal to 1, or override the offsets of the current picture when ph_scaling_window_present_idc is equal to 2, for scaling ratio calculation for the j-th entry in reference picture list i of the current slice.

It is a requirement of bitstream conformance that for any active entry in a reference picture list for all slices of the current picture, which refers to the same reference picture, the value of slice_scaling_win_flag[i][j] shall be the same.

Figure 8C:
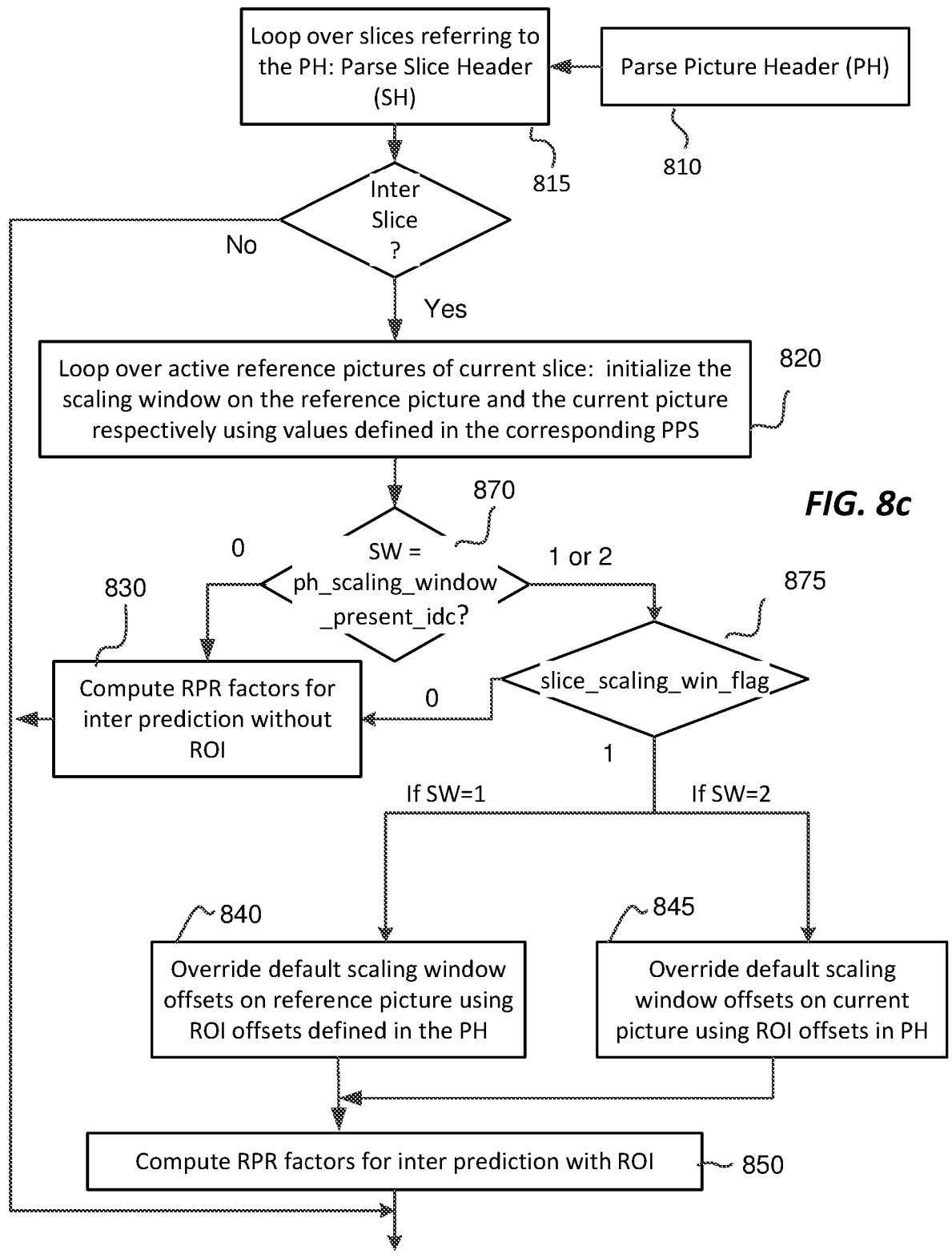

FIG. 8c depicts an example process flow for the Third variation. As depicted in FIG. 8c, compared to the process in FIG. 8a, the only changes are in steps 870 and 875, where the decoder proceeds according to the newly defined syntax elements. Note that in step 875, for "Yes", the values of "1" or "2" are inherited from the value of the ROI switch SW=ph_scaling_window_present_idc variable (see step 870) and are used after step 875 to decide whether the ROI offsets are to be applied on the reference picture (step 840) (e.g., when SW=1) or the current picture (step 845) (e.g., when SW=2). Then, the decoding process is modified as follows. Compared to the First variation, the new syntax elements are underlined.

In Section 8.3.2 of VVC

```
for( i = 0; i < 2; i++ ) {
    for( j = 0, k = 0, pocBase = PicOrderCntVal; j < num_ref_entries[ i ][ RplsIdx[ i ] ]; j++) {
    ......
        fRefWidth is set equal to PicOutputWidthL of the reference picture RefPicList[ i ][ j ]
        fRefHeight is set equal to PicOutputHeightL of the reference picture RefPicList[ i ][ j ]
        fCurrWidth = PicOutputWidthL
        fCurrHeight = PicOutputHeightL
        refPicWidth, refPicHeight, refScalingWinLeftOffset, refScalingWinRightOffset, refScalingWinTopOffset,
            and refScalingWinBottomOffset, are set equal to the values of
        pic_width_in_luma_samples,
            pic_height_in_luma_samples, scaling_win_left_offset,
        scaling_win_right_offset,
            scaling_win_top_offset, and scaling_win_bottom_offset, respectively, of the
        reference picture RefPicList[ i ][ j ]
        RefRprLeftOffset[ i ][ j ] = subWidthC * refScalingWinLeftOffset
        RefRprTopOffset[ i ][ j ] = subHeightC * refScalingWinTopOffset
        CurrRprLeftOffset[ i ][ j ] = subWidthC * scaling win left offset
        CurrRprTopOffset[ i ][ j ] = subHeightC * scaling_win_top_offset
        if(ph_scaling_window_present_idc>0&&slice_scaling_win_flag[i][j] )
        {
            if ( ph_scaling_window_present_idc==1 ) {
                fRefWidth = refPicWidth - (PhScalingWinLeftOffset + PhScalingRightWinOffset)
                fRefHeight = refPicHeight - (PhScalingWinTopOffset + PhScalingWinBottomOffset )
                RefRprLeftOffset[ i ][ j ] = PhScalingWinLeftOffset
                RefRprTopOffset[ i ][ j ] = PhScalingWinTopOffset
            }
            else if( ph_scaling_window_present_idc ==2 ) {
                fCurrWidth = pic_width_in_luma_samples - (PhScalingWinLeftOffset + PhScalingWinRightOffset)
                fCurrHeight = pic_height_in_luma_samples - (PhScalingWinTopOffset + PhScaling Bottom WinOffset)
                CurrRprLeftOffset[ i ][ j ] = PhScalingWinLeftOffset
                CurrRprTopOffset[ i ][ j ] = PhScalingWinTopOffset
            }
        }
```

```
    RefPicScale[ i ][ j ][ 0 ] = ( ( fRefWidth << 14 ) + ( fCurrWidth
>> 1 ) ) / fCurrWidth
    RefPicScale[ i ][ j ][ 1 ] = ( ( fRefHeight << 14 ) + ( fCurrHeight
>> 1 ) ) / fCurrHeight
    RprConstraintsActive[ i ][ j ] = ( pic_width_in_luma_samples != refPicWidth ||
        pic_height_in_luma_samples != refPicHeight ||
        CurrRprLeftOffset [ i ][ j ] != RefRprLeftOffset [ i ][ j ] ||
        CurrRprTopOffset[ i ][ j ] != RefRprTopOffset[ i ][ j ] ||
        fCurrWidth != fRefWidth ||
        fCurrHeight != fRefHeight )
   }
}
```

Fourth Variation (Relative window offsets and ROI override switch)

Figure 8D:
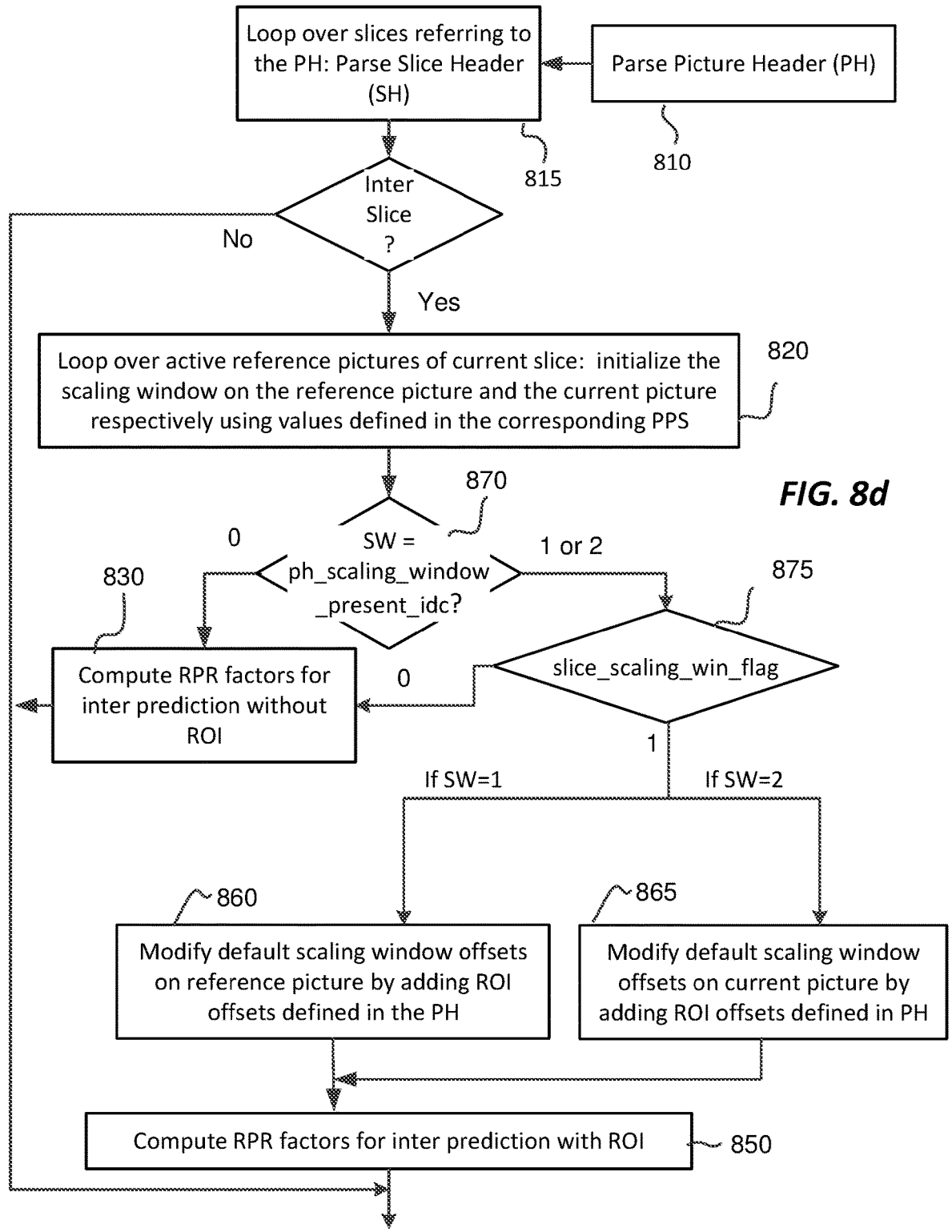

This variation combines the syntax elements of the Second variation (transmitting delta offsets) with the new syntax elements defined in the Third variation. FIG. 8*d* depicts an example process flow for the Fourth variation. As depicted in FIG. 8*d*, compared to the process in FIG. 8*b*, the only changes are in steps 870 and 875, where the decoder proceeds according to the newly defined syntax elements, as discussed in relation to FIG. 8*c*. Then, the decoding process is modified as follows. Compared to the First variation, underlined elements denote the changes due to the Third variation and bold elements denote changes due to the Second variation.

8.3.2 Decoding Process for Reference Picture Lists Construction

```
for( i = 0; i < 2; i++ ) {
    for( j = 0, k = 0, pocBase = PicOrderCntVal; j < num_ref_entries[ i ][ RplsIdx[ i ] ];
j++) {
    ......
        fRefWidth is set equal to PicOutputWidthL of the reference picture
RefPicList[ i ][ j ]
        fRefHeight is set equal to PicOutputHeightL of the reference picture
RefPicList[ i ][ j ]
        fCurrWidth = PicOutputWidthL
        fCurrHeight = PicOutputHeightL
        refPicWidth, refPicHeight, refScalingWinLeftOffset, refScalingWinRightOffset,
refScalingWinTopOffset,
            and refScalingWinBottomOffset, are set equal to the values of
pic_width_in_luma_samples,
            pic_height_in_luma_samples, scaling_win_left_offset,
scaling_win_right_offset,
            scaling_win_top_offset, and scaling_win_bottom_offset, respectively, of the
reference picture RefPicList[ i ][ j ]
        RefRprLeftOffset[ i ][ j ] = subWidthC * refScalingWinLeftOffset
        RefRprTopOffset[ i ][ j ] = subHeightC * refScalingWinTopOffset
        CurrRprLeftOffset[ i ][ j ] = subWidthC * scaling_win_left_offset
        CurrRprTopOffset[ i ][ j ] = subHeightC * scaling_win_top_offset
        if( ph_scaling_window_present_idc > 0 && slice_scaling_win_flag[i][j] )
        {
            if ( ph_scaling_window_present_idc==1 ) {
                fRefWidth = fRefWidth - (PhScalingWinLeftOffset +
PhScalingRightWinOffset)
                fRefHeight = fRefHeight - (PhScalingWinTopOffset +
PhScalingWinBottomOffset )
                RefRprLeftOffset[ i ][ j ] = RefRprLeftOffset[ i ][ j ] +
PhScalingWinLeftOffset
                RefRprTopOffset[ i ][ j ] = RefRprTopOffset[ i ][ j ] +
PhScalingWinTopOffset
            }
            else if( ph_scaling_window_present_idc==2 ) {
                fCurrWidth = fCurrWidth - (PhScalingWinLeftOffset +
PhScalingWinRightOffset)
                fCurrHeight = fCurrHeight - (PhScalingWinTopOffset + PhScaling
Bottom WinOffset)
                CurrRprLeftOffset[ i ][ j ] = CurrRprLeftOffset[ i ][ j ] +
PhScalingWinLeftOffset
                CurrRprTopOffset[ i ][ j ] = CurrRprTopOffset[ i ][ j ] +
PhScalingWinTopOffset
            }
        }
        RefPicScale[ i ][ j ][ 0 ] = ( ( fRefWidth << 14 ) + ( fCurrWidth
>> 1 ) ) / fCurrWidth
        RefPicScale[ i ][ j ][ 1 ] = ( ( fRefHeight << 14 ) + ( fCurrHeight
>> 1 ) ) / fCurrHeight
            RprConstraintsActive[ i ][ j ] = ( pic_width_in_luma_samples != refPicWidth ||
                pic_height_in_luma_samples != refPicHeight ||
                CurrRprLeftOffset [ i ][ j ] != RefRprLeftOffset [ i ][ j ] ||
                CurrRprTopOffset[ i ][ j ] != RefRprTopOffset[ i ][ j ] ||
```

```
        fCurrWidth != fRefWidth ||
        fCurrHeight != fRefHeight )
    }
}
```

From an implementation point of view, to reduce the required memory for motion compensation when an ROI window is used for the current picture, one can add an encoder constrain that for samples/blocks outside the ROI window only intra prediction is being used.

REFERENCES

Each one of the references listed herein is incorporated by reference in its entirety.
[1] *High efficiency video coding*, H.265, Series H, Coding of moving video, ITU, (February 2018).
[2] B. Bross, J. Chen, S. Liu, and Y-K. Wang "*Versatile Video Coding* (Draft 7)," JVET output document, JVET-P2001, vE (14), uploaded Nov. 14, 2019.
[3] S. Wenger, et al., "*AHG8: Spatial scalability using reference picture resampling*," JVET-O0045, JVET Meeting, Gothenburg, SE, July 2019.
[4] R. Skupin et al., *AHG12: "On filtering of independently coded region*," JVET-O0494 (v3), JVET Meeting, Gothenburg, SE, July 2019.
[5] B. Bross, J. Chen, S. Liu, and Y-K. Wang "*Versatile Video Coding* (Draft 8)," JVET output document, JVET-Q2001, vC (12), uploaded Feb. 9, 2020.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to canvas size resizing, such as those described herein. The computer and/or IC may compute any of a variety of parameters or values that relate to canvas size resizing described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to canvas size resizing as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to canvas size resizing are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Appendix 1

This Appendix includes an example embodiment for canvas resizing as implemented using the VVC video codec (Ref.[2]). Proposed edits to the existing VVC specification are in Italics.

7.3.2.3 Sequence Parameter Set RBSP Syntax

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   gdr_enabled_flag | u(1) |
|   sps_seq_parameter_set_id | u(4) |
|   chroma_format_idc | u(2) |

-continued

| | Descriptor |
|---|---|
| if( chroma_format_idc = = 3 ) | |
|   separate_colour_plane_flag | u(1) |
| ref_pic_resampling_enabled_flag | u(1) |
| pic_width_max_in_luma_samples | ue(v) |
| pic_height_max_in_luma_samples | ue(v) |
| if( ref_pic_resampling_enabled_flag ) { | |
|   sps_rpr_roi_window_present_flag | u(1) |
|   if( sps_rpr_roi_window_present_flag ) { | |
|     num_roi_window_list_minus1 | ue(v) |
|     for( i = 0; i <= num_roi_window_list_minus1; i ++ ) { | |
|       roi_offset_prec_shift[ i ] | ue(v) |
|       roi_offset_list[ i ][0] /*left    */ | ue(v) |
|       roi_offset_list[ i ][1] /*right   */ | ue(v) |
|       roi_offset_list[ i ][2] /*top     */ | ue(v) |
|       roi_offset_list[ i ][3] /*bottom  */ | ue(v) |
|     } | |
|   } | |
| } | |
| ... | |

7.4.3.3 Sequence Parameter Set RBSP Semantics sps_rpr_roi_window_present_flag equal to 1 indicates that the lists of the reference picture resampling ROI window offset parameters follow next in the SPS. sps_rpr_roi_window_present_flag equal to 0 indicates that the lists of the reference picture resampling ROI window offset parameters are not present in the SPS. When not present, the value of sps_rpr_roi_window_present_flag is inferred to be equal to 0.

num_roi_window_list_minus1 plus 1 specifies the number of roi_offset_list syntax elements that are present in the SPS. The value of num_roi_window_list_minus1 shall be in the range of 0 to 15, inclusive. When not present, the value of num_roi_window_list_minus1 is inferred to be 0.

roi_offset_prec_shift[i] specifies the left shift bit to the i-th roi_offset_list syntax elements. The value of roi_offset_prec_shift[i] shall be in the range of 0 to 7, inclusive. When not present, the value of roi_offset_prec_shift[i] is inferred to be 0.

roi_offset_list[i][j] left shifted by roi_offset_prec_shift[i] specifies the reference picture resampling ROI window offsets of the i-th roi_offset_list, in units of luma samples, which are applied for scaling ratio calcualtions, where j equals to 0 indicates the left offset, j equal to 1 indicates the right offset, j equal to 2 indicates the top offset, and j equals to 3 indicates the bottom offset. When no present, the values of roi_offset_list[i][j] are inferred to be 0. The values of roi_offset_list[i][0] and roi_offset_list[i][1] shall be multiple of SubWidthC and the values of roi_offset_list[i][2] and roi_offset_list[i][3] shall be multiple of SubHeightC.

The variable RoiOffsetList[i][j] is set equal to (roi_offset_list[i][j]<<roi_offset_prec_shift[i]).

The value of (RoiOffsetList[i][0]+RoiOffsetList[i][1]) shall be less than pic_width_in_luma_samples of the picture that the ROI window is associated with, and the value of (RoiOffsetList [i][2]+RoiOffsetList [i][3]) shall be less than pic_height_in_luma_samples of the picture that the ROI window is associated with.

7.3.7.1 General slice header syntax

| | Descriptor |
|---|---|
| slice_header( ) { | |
| ... | |
|   if( slice_type != I && | |
|     sps_rpr_roi_window_present_flag ) { | |
|     slice_rpr_roi_window_enabled_flag | u(1) |
|     if( slice_rpr_roi_window_enabled_flag ) { | |
|       for( i = 0; i < slice_type = = B ? 2: 1; i ++ ) | |
|     { | |
|       for( j = 0; j < num_ref_entries[ i ][ RplsIdx[ i ] ]; j ++ ) { | |
|         curr_roi_window_present_flag[ i ][ j ] | u(1) |
|         if( curr_roi_window_present_flag[ i ][ j ] ) | |
|           curr_roi_offset_idx[ i ][ j ] | u(v) |
|         ref_roi_window_present_flag[ i ][ j ] | u(1) |
|         if( ref_roi_window_present_flag[ i ][ j ] ) | |
|           ref_roi_offset_idx[ i ][ j ] | u(v) |
|       } | |
|     } | |
|   } | |
| } | | slice_rpr_roi_window_enabled_flag equal to 1 specifies that the ROI window offset parameters may be used for the scaling ratio calculations. slice_rpr_roi_window_enabled_flag equal to 0 specifies that the ROI window offset parameters may not be used for the scaling ratio calculations. When not present, the value of slice_rpr_roi_window_enabled_flag is inferred to be equal to 0.

curr_roi_window_present_flag[i][j] equal to 1 specifies that a set of ROI window offset parameters is used in the current picture to derive the scaling ratio for the j-th entry of the i-th reference picture list. curr_roi_window_present_flag[i][j] equal to 0 specifies that a set of ROI window offset parameters is not used in the current picture to derive the scaling ratio for the j-th entry of the i-th reference picture list.

curr_roi_offset_idx[i][j], when present, specifies which set of ROI window offset parameters in the array roi_offset_list is used in the current picture to derive the scaling ratio for the j-th entry of the i-th reference picture list. The value of curr_roi_offset_idx[i][j] shall be in the range of 0 to num_roi_window_list_minus1, inclusive. The length of the syntax element is Ceil(Log2(num_roi_window_list_minus1+1)) bits.

ref_roi_window_present_flag[i][j] equal to 1 specifies that a set of ROI window offset parameters is used in the reference picture to derive the scaling ratio for the j-th entry of the i-th reference picture list. ref_roi_window_present_flag[i][j] equal to 0 specifies that a set of ROI window offset parameters is not used in the reference picture to derive the scaling ratio for the j-th entry of the i-th reference picture list.

ref_roi_offset_idx[i][j], when present, specifies which set of ROI window offset parameters in the array roi_offset_list is used in the reference picture to derive the scaling ratio for the j-th entry of the i-th reference picture list. The value of ref_roi_offset_idx[i][j] shall be in the range of 0 to num_roi_window_list_minus1, inclusive. The length of the syntax element is Ceil(Log2(num_roi_window_list_minus1+1)) bits.

8.3.2 Decoding Process for Reference Picture Lists Construction

This process is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified in clause 8.3.3 or in decoding of the slice data.

NOTE 1—For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1], the reference picture scaling ratios RefPicScale[i][j][0] and RefPicScale[i][j][1], the reference picture scaled flags RefPicIsScaled[0] and RefPicIsScaled[1], the ROI offsets lists for the current picture CurrROIOffset[i][j][0], CurrROIOffset[i][j][1], CurrROIOffset[i][j][2], and CurrROIOffset[i][j][3] and the ROI offsets lists for the reference picture RefROIOffset[i][j][0], RefROIOffset[i][j][1], RefROIOffset[i][j][2], and RefROIOffset[i][j][3], relative to the reference picture RefPicList[i][j], are constructed as follows:

```
for( i = 0; i < 2; i++ ) {
  for( j = 0, k = 0, pocBase = PicOrderCntVal; j < num_ref_entries[ i ][ RplsIdx[ i ] ]; j++) {
    if( !inter_layer_ref_pic_flag[ i ][ RplsIdx[ i ] ][ j ] ) {
              if( st_ref_pic_flag[ i ][ RplsIdx[ i ] ][ j ] ) {
                RefPicPocList[ i ][ j ] = pocBase − DeltaPocValSt[ i ][ RplsIdx[ i ] ][ j ]
                if( there is a reference picture picA in the DPB with the same nuh_layer_id as the current picture
                        and PicOrderCntVal equal to RefPicPocList[ i ][ j ] )
                  RefPicList[ i ][ j ] = picA
                else
                  RefPicList[ i ][ j ] = "no reference picture"       (200)
                pocBase = RefPicPocList[ i ][ j ]
              } else {
                if( !delta_poc_msb_cycle_lt[ i ][ k ] ) {
                  if( there is a reference picA in the DPB with the same nuh_layer_id as the current picture and
                        PicOrderCntVal & ( MaxPicOrderCntLsb − 1 ) equal to PocLsbLt[ i ][ k ] )
                      RefPicList[ i ][ j ] = picA
                      else
                        RefPicList[ i ][ j ] = "no reference picture"
                      RefPicLtPocList[ i ][ j ] = PocLsbLt[ i ][ k ]
                } else {
                  if( there is a reference picA in the DPB with the same nuh_layer_id as the current picture and
                              PicOrderCntVal equal to             FullPocLt[ i ][ k ] )
                        RefPicList[ i ][ j ] = picA
                      else
                        RefPicList[ i ][ j ] = "no reference picture"
                      RefPicLtPocList[ i ][ j ] = FullPocLt[ i ][ k ]
                }
                k++
              }
    } else {
              layerIdx = DirectDependentLayerIdx[ GeneralLayerIdx[ nuh_layer_id ] ][ ilrp_idx[ i ][ RplsIdx ][ j ] ]
              refPicLayerId = vps_layer_id[ layerIdx ]
              if( there is a reference picture picA in the DPB with nuh_layer_id equal to refPicLayerId and
                        the same PicOrderCntVal as the current picture )
                RefPicList[ i ][ j ] = picA
              else
                RefPicList[ i ][ j ] = "no reference picture"
    }
    fRefWidth is set equal to PicOutputWidthL of the reference picture RefPicList[ i ][ j ] in luma samples
    fRefHeight is set equal to PicOutputHeightL of the reference picture RefPicList[ i ][ j ] in luma samples
    /* Default scaling offsets (block 715) */
      fCurrWidth is set equal to PicOutputWidthL of the current picture in luma samples
      fCurrHeight is set equal to PicOutputHeightL of the current picture in luma samples
      CurrROIOffset[ i ][ j ][ 0 ] is set equal to scaling_win_left_offset of the current picture
      CurrROIOffset[ i ][ j ][ 1 ] is set equal to scaling_win_right_offset of the current picture
      CurrROIOffset[ i ][ j ][ 2 ] is set equal to scaling_win_top_offset of the current picture
```

CurrROIOffset[ i ][ j ][ 3 ] is set equal to scaling_win_bottom_offset of the current picture
RefROIOffset[ i ][ j ][ 0 ] is set equal to scaling_win_left_offset of the reference picture RefPicList[ i ][ j ]
RefROIOffset[ i ][ j ][ 1 ] is set equal to scaling_win_right_offset of the reference picture                RefPicList[ i ][ j ]
RefROIOffset[ i ][ j ][ 2 ] is set equal to scaling_win_top_offset of the reference picture RefPicList[ i ][ j ]
RefROIOffset[ i ][ j ][ 3 ] is set equal to scaling_win_bottom_offset of the reference picture                RefPicList[ i ][ j ]

```
            if ( !slice_rpr_roi_window_enabled_flag ) {
/* Default Horizontal and verical scaling (block 722)
 */        RefPicScale[ i ][ j ][ 0 ] =
( ( fRefWidth << 14 ) + ( fCurrWidth >> 1 ) ) / fCurrWidth
           RefPicScale[ i ][ j ][ 1 ] =
( ( fRefHeight << 14 ) + ( fCurrHeight >> 1 ) ) / fCurrHeight
           RefPicIsScaled[ i ][ j ] = ( RefPicScale[ i ][ j ][ 0 ] != ( 1 << 14 ) ) ||
                   ( RefPicScale[ i ][ j ][ 1 ] != ( 1 << 14 ) )
  } else {
           fCurrPicWidth is set equal to pic_width_in_luma_samples of the current
           picture
           fCurrPicHeight is set equal to pic_width_in_luma_samples of the current
           picture
           fRefPicWidth is set equal to pic_width_in_luma_samples of the reference
           picture
RefPicList[ i ][ j ]
           fCurrPicHeight is set equal to pic_width_in_luma_samples of the reference
picture RefPicList[ i ][ j ]
           if ( curr_roi_window_present_flag[ i ][ j ]) {
/* block 730 */
           CurrROIOffset[ i ][ j ][ 0 ] = RoiOffsetList[ curr_roi_offset_idx[ i ][ j ] ][ 0 ]
           CurrROIOffset[ i ][ j ][ 1 ] = RoiOffsetList[ curr_roi_offset_idx[ i ][ j ] ][ 1 ]
           CurrROIOffset[ i ][ j ][ 2 ] = RoiOffsetList[ curr_roi_offset_idx[ i ][ j ] ][ 2 ]
           CurrROIOffset[ i ][ j ][ 3 ] = RoiOffsetList[ curr_roi_offset_idx[ i ][ j ] ][ 3 ]
           fCurrWidth =
fCurrPicWidth − (CurrROIOffset[ i ][ j ][ 0 ] + CurrROIOffset[ i ][ j ][ 1 ])
           fCurrHeight =
fCurrPicHeight − (CurrROIOffset[ i ][ j ][ 2 ] + CurrROIOffset[ i ][ j ][ 3 ])
           }
           if( ref_roi_window_present_flag[ i ][ j ]) {
/* block 740 */
           RefROIOffset[ i ][ j ][ 0 ] = RoiOffsetList[ ref_roi_offset_idx[ i ][ j ] ][ 0 ]
           RefROIOffset[ i ][ j ][ 1 ] = RoiOffsetList[ ref_roi_offset_idx[ i ][ j ] ][ 1 ]
           RefROIOffset[ i ][ j ][ 2 ] = RoiOffsetList[ ref_roi_offset_idx[ i ][ j ] ][ 2 ]
           RefROIOffset[ i ][ j ][ 3 ] = RoiOffsetList[ ref_roi_offset_idx[ i ][ j ] ][ 3 ]
           fRefWidth =
fRefPicWidth − (RefROIOffset[ i ][ j ][ 0 ] + RefROIOffset[ i ][ j ][ 1 ])
           fRefHeight =
fRefPicHeight − (RefROIOffset[ i ][ j ][ 2 ] + RefROIOffset[ i ][ j ][ 3 ])
           }
/*block 745 */
           RefPicScale[ i ][ j ][ 0 ] = ( ( fRefWidth << 14 ) + ( fCurrWidth
>> 1 ) ) / fCurrWidth
           RefPicScale[ i ][ j ][ 1 ] = ( ( fRefHeight << 14 ) + ( fCurrHeight
>> 1 ) ) / fCurrHeight
           RefPicIsScaled[ i ][ j ] = ( RefPicScale[ i ][ j ][ 0 ] != ( 1 << 14 ) ) ||
                   ( RefPicScale[ i ][ j ][ 1 ] != ( 1 << 14 ) ) ||
                   ( fCurrPicWidth != fRefPicWidth ) ||
                   ( fCurrPicHeight != fRefPicHeight )
           }
      }
   }
}
```

8.5.6.3 Fractional Sample Interpolation Process
8.5.6.3.1 General
Inputs to this process are:
  a luma location (xSb, ySb) specifying the top-left sample of the current coding subblock relative to the top-left luma sample of the current picture,
  a variable sbWidth specifying the width of the current coding subblock,
  a variable sbHeight specifying the height of the current coding subblock,
  a motion vector offset mvOffset,
  a refined motion vector refMvLX,
  the selected reference picture sample array refPicLX, with a value X representing its corresponding reference list and a corresponding reference index refIdxLX,
  the half sample interpolation filter index hpelIfIdx,
  the bi-directional optical flow flag bdofFlag,
  a variable cIdx specifying the colour component index of the current block,
  a list of two scaling ratios, horizontal and vertical, scalingRatio,
  a list of ROI offsets RefROIOffset[X][refIdxLX][0], RefROIOffset[X][refIdxLX][2], CurrROIOffset[X][refIdxLX][0] and CurrROIOffset[X][refIdxLX][2], corresponding to the selected reference picture sample array refPicLX.

Outputs of this process are:
an (sbWidth+brdExtSize)×(sbHeight+brdExtSize) array predSamplesLX of prediction sample values.

The prediction block border extension size brdExtSize is derived as follows:

$$\text{brdExtSize} = (\text{bdofFlag} \| (\text{inter\_affine\_flag}[xSb][ySb] \&\& !\text{pic\_disable\_prof\_flag})) ? 2 : 0 \quad (936)$$

The variable fRefLeftOffset is set equal to (RefROIOffset[X][refIdxLX][0]<<10).
The variable fReflopOffset is set equal to (RefROIOffset[X][refIdxLX][2]<<10).
The variable fCurrLeftOffset is set equal to CurrROIOffset[X][refIdxLX][0].
The variable fCurrTopOffset is set equal to CurrROIOffset[X][refIdxLX][2].
The (sbWidth+brdExtSize)×(sbHeight+brdExtSize) array predSamplesLX of prediction sample values is derived as follows:

The motion vector mvLX is set equal to (refMvLX−mvOffset).

If cIdx is equal to 0, the following applies:
Let $(xInt_L, yInt_L)$ be a luma location given in full-sample units and $(xFrac_L, yFrac_L)$ be an offset given in 1/16-sample units. These variables are used only in this clause for specifying fractional-sample locations inside the reference sample arrays refPicLX.
The top-left coordinate of the bounding block for reference sample padding $(xSbInt_L, ySbInt_L)$ is set equal to (xSb+(mvLX[0]>>4), ySb+(mvLX[1]>>4)).
For each luma sample location $(x_L=0 \ldots \text{sbWidth}-1+\text{brdExtSize}, y_L=0 \ldots \text{sbHeight}-1+\text{brdExtSize})$ inside the prediction luma sample array predSamplesLX, the corresponding prediction luma sample value predSamplesLX$[x_L][y_L]$ is derived as follows:
Let $(refxSb_L, refySb_L)$ and $(refx_L, refy_L)$ be luma locations pointed to by a motion vector (refMvLX[0], refMvLX[1]) given in 1/16-sample units. The variables $refxSb_L$, $refx_L$, $refySb_L$, and $refy_L$ are derived as follows:

$$refxSb_L = (((xSb - fCurrLeftOffset) << 4) + refMvLX[0]) * \text{scalingRatio}[0] \quad (937)$$

$$refx_L = ((Sign(refxSb_L) * ((Abs(refxSb_L) + 128) >> 8) + x_L * ((\text{scalingRatio}[0] + 8) >> 4)) + fRefLeftOffset + 32) >> 6 \quad (938)$$

$$refySb_L = (((ySb - fCurrTopOffset) << 4) + refMvLX[1]) * \text{scalingRatio}[1] \quad (939)$$

$$refy_L = ((Sign(refySb_L) * ((Abs(refySb_L) + 128) >> 8) + y_L * ((\text{scalingRatio}[1] + 8) >> 4)) + fRefTopOffset + 32) >> 6 \quad (940)$$

The variables $xInt_L$, $yInt_L$, $xFrac_L$ and $yFrac_L$ are derived as follows:

$$xInt_L = refx_L >> 4 \quad (941)$$

$$yInt_L = refy_L >> 4 \quad (942)$$

$$xFrac_L = refx_L \ \& \ 15 \quad (943)$$

$$yFrac_L = refy_L \ \& \ 15 \quad (944)$$

The prediction luma sample value predSamplesLX$[x_L][y_L]$ is derived as follows:

If bdofFlag is equal to TRUE or (pic_disable_prof_flag is equal to FALSE and inter_affine_flag[xSb][ySb] is equal to TRUE), and one or more of the following conditions are true, the prediction luma sample value predSamplesLX$[x_L][y_L]$ is derived by invoking the luma integer sample fetching process as specified in clause 8.5.6.3.3 with $(xInt_L+(xFrac_L>>3)-1)$, $yInt_L+(yFrac_L>>3)-1)$ and refPicLX as inputs.

$x_L$ is equal to 0.
$x_L$ is equal to sbWidth+1.
$y_L$ is equal to 0.
$y_L$ is equal to sbHeight+1.

Otherwise, the prediction luma sample value predSamplesLX[xL][yL] is derived by invoking the luma sample 8-tap interpolation filtering process as specified in clause 8.5.6.3.2 with (xIntL−(brdExtSize>0? 1:0), yIntL−(brdExtSize>0? 1:0)), (xFracL, yFracL), $(xSbInt_L, ySbInt_L)$, refPicLX, hpelIfIdx, sbWidth, sbHeight, scalingRatio[0], scalingRatio[1], and (xSb, ySb) as inputs.

Otherwise (cIdx is not equal to 0), the following applies:
Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).
For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
Let $(refxSb_C, refySb_C)$ and $(refx_C, refy_C)$ be chroma locations pointed to by a motion vector (refMvLX[0], refMvLX[1]) given in 1/32-sample units. The variables $refxSb_C$, $refySb_C$, $refx_C$ and $refy_C$ are derived as follows:

$$addX = sps\_chroma\_horizontal\_collocated\_flag ? 0 : 8 * (\text{scalingRatio}[0] - (1 << 14)) \quad (945)$$

$$addY = sps\_chroma\_vertical\_collocated\_flag ? 0 : 8 * (\text{scalingRatio}[1] - (1 << 14)) \quad (946)$$

$$refxSb_C = (((xSb - fCurrLeftOffset)/SubWidthC << 5) + refMvLX[0]) * \text{scalingRatio}[0] + addX \quad (947)$$

$$refx_C = ((Sign(refxSb_C) * ((Abs(refxSb_C) + 256) >> 9) + xC * ((\text{scalingRatio}[0] + 8) >> 4)) + fRefLeftOffset/SubWidthC + 16) >> 5 \quad (948)$$

$$refySb_C = (((ySb - fCurrTopOffset)/SubHeightC << 5) + refMvLX[1]) * \text{scalingRatio}[1] + addY \quad (949)$$

$$refy_C = ((Sign(refySb_C) * ((Abs(refySb_C) + 256) >> 9) + yC * ((\text{scalingRatio}[1] + 8) >> 4)) + fRefTopOffset/SubHeightC + 16) >> 5 \quad (950)$$

The variables xInt$_C$, yInt$_C$, xFrac$_C$ and yFrac$_C$ are derived as follows:

$$xInt_C = refx_C >> 5 \quad (951)$$

$$yInt_C = refy_C >> 5 \quad (952)$$

$$xFrac_C = refx_C \ \& \ 31 \quad (953)$$

$$yFrac_C = refy_C \ \& \ 31 \quad (954)$$

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight, refPicLX, scalingRatio[0], and scalingRatio[1] as inputs.

NOTE—Unlike the process specified in clause 8.4.5.2.13, this process uses both sps_chroma_vertical_collocated_flag and sps_chroma_horizontal_collocated_flag.

Appendix 2

This Appendix includes an example embodiment for ROI support as implemented using the First variation within the VVC video codec (Ref.[5]). Proposed edits to the existing VVC specification are in Italics.

7.3.2.4 Picture Parameter Set RBSP Syntax
scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to SubWidthC*pps_conf_win_left_offset, SubWidthC*pps_conf_win_right_offset, SubHeightC*pps_conf_win_top_offset, and SubHeightC*pps_conf_win_bottom_offset, respectively.

The value of SubWidthC*(scaling_win_left_offset+scaling_win_right_offset) shall be less than pic_width_in_luma_samples, and the value of SubHeightC*(scaling_win_top_offset+scaling_win_bottom_offset) shall be less than pic_height_in_luma_samples.

The variables PicOutputWidthL and PicOutputHeightL are derived as follows:

$$PicOutputWidthL = pic\_width\_in\_luma\_samples - SubWidthC*(scaling\_win\_right\_offset + scaling\_win\_left\_offset) \quad (78)$$

$$PicOutputHeightL = pic\_height\_in\_luma\_samples - SubWidthC*(scaling\_win\_bottom\_offset + scaling\_win\_top\_offset) \quad (79)$$

Let refPicOutputWidthL and refPicOutputHeightL be the PicOutputWidthL and PicOutputHeightL, respectively, of a reference picture of a current picture referring to this PPS. It is a requirement of bitstream conformance that all of the following conditions are satisfied:
  PicOutputWidthL*pic_width_max_in_luma_samples shall be greater than or equal to refPicOutputWidthL*(pic_width_in_luma_samples−Max(8, MinCbSizeY)).
  PicOutputHeightL*pic_height_max_in_luma_samples shall be greater than or equal to refPicOutputHeightL*(pic_height_in_luma_samples−Max(8, MinCbSizeY)).

7.3.2.7 Picture Header Structure Syntax

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   ...... | |
|   if( ph_inter_slice_allowed_flag ) { | |
|     ...... | |
|     if( res_change_in_clvs_allowed_flag ) { | |
|       *ph_scaling_window_present_flag* | *u(1)* |
|       *if( ph_scaling_window_present_flag ) {* | |
|         *ph_scaling_win_offset_prec_shift* | *ue(v)* |
|         *ph_scaling_win_left_offset* | *ue(v)* |
|         *ph_scaling_win_right_offset* | *ue(v)* |
|         *ph_scaling_win_top_offset* | *ue(v)* |
|         *ph_scaling_win_bottom_offset* | *ue(v)* |
|       } | |
|     } | |
|   } | |
|   ...... | |
| } | | ph_scaling_window_present_flag equal to 1 specifies that the scaling window offset parameters are present in the PH and may be applied for the scaling ratio calculation for all slices associated with the PH. ph_scaling_window_present_present_flag equal to 0 specifies that the scaling window offset parameters are not present in the PH. When not present, the value of ph_scaling_window_present_flag is inferred to be equal to 0.

ph_scaling_win_offset_offset_prec_shift specifies the number of bits by which a left shift is performed for the calculation of the scaling window offsets. The value of ph_scaling_win_offset_prec_shift shall be in the range of 0 to 7, inclusive.

ph_scaling_win_left_offset, ph_scaling_win_right_offset, ph_scaling_win_top_offset, and ph_scaling_win_bottom_offset specify the offsets that are applied to the picture size for scaling ratio calculation. When not present, the values of ph_scaling_win_left_offset, ph_scaling_win_right_offset, ph_scaling_win_top_offset, and ph_scaling_win_bottom_offset are inferred to be equal to 0.

The variables PhScalingWinLeftOffset, PhScalingWinRightOffset, PhScalingWinTopOffset, and PhScalingWinBottomOffset, ares set equal to SubWidthC*(ph_scaling_win_left_offset<<ph_scaling_win_offset_prec_shift), SubWidthC*(ph_scaling_win_right_offset<<ph_scaling_win_offset_prec_shift), SubHeightC*(ph_scaling_win_top_offset<<ph_scaling_win_offset_prec_shift), and SubHeightC*(ph_scaling_win_bottom_offset<<ph_scaling_win_offset_prec_shift), respectively.

The value of (PhScalingWinLeftOffset+PhScalingWinRightOffset) shall be less than pic_width_luma_samples of the picture which applies the scaling window in the PH. The value of (PhScalingWinTopOffset+PhScalingWinBottomOffset) shall be less than pic_height_in_luma_samples of the picture which applies the scaling window in the PH.

The value of PhScalingWinLeftOffset shall be greater than or equal to SubWidthC*scaling_win_left_offset of the picture which applies the scaling window in the PH.

The value of PhScalingWinRightOffset shall be greater than or equal to SubWidthC*scaling_win_right_offset of the picture which applies the scaling window in the PH.

The value of PhScalingWinTopOffset shall be greater than or equal to SubHeightC*scaling_win_top_offset of the picture which applies the scaling window in the PH.
The value of PhScalingWinBottomOffset shall be greater than or equal to SubHeightC*scaling_win_bottom_offset of the picture which applies the scaling window in the PH.
7.3.7.1 General Slice Header Syntax

|  | Descriptor |
|---|---|
| slice_header( ) { |  |
|   picture_header_in_slice_header_flag | u(1) |
|   if( picture_header_in_slice_header_flag ) |  |
|     picture_header_structure( ) |  |
|   ...... |  |
|   if( slice_type != I ) { |  |
|     if( ph_scaling_window_present_flag ) |  |
|       for( i = 0; i < slice_type = = B ? 2 : 1; i++ ) |  |
|         for( j = 0; j < NumRefIdxActive[ i ]; j++ ) |  |
|           slice_scaling_win_idc[ i ][ j ] /*0:not present,1: present in ref; 2:present in current */ | u(2) or ue(v) |
|   ...... |  |
|   } |  |
|   ...... |  |
| } |  | slice_scaling_win_idc[i][j] equal to 0 specifies the scaling window offsets in PH is not used for scaling ratio calculation for the j-th entry in reference picture list i of the current slice. slice_scaling_win_idc[i][j] equal to 1 specifies the scaling window offsets in PH is used to override the offsets of the reference picture for scaling ratio calculation for the j-th entry in reference picture list i of the current slice. slice_scaling_win_idc[i][j] equal to 2 specifies the scaling window offsets in PH is used to override the offsets of the current picture for scaling ratio calculation for the j-th entry in reference picture list i of the current slice.
It is a requirement of bitstream conformance that for any active entry in a reference picture list for all slices of the current picture, which refers to the same reference picture, the value of slice_scaling_win_idc[i][j] shall be the same.

8.3.3 Decoding Process for Reference Picture Lists Construction

This process is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified in clause 8.3.3 or in decoding of the slice data.

NOTE 1—For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1], the reference picture scaling ratios RefPicScale[i][j][0] and RefPicScale[i][j][1], the reference picture scaled flags RprConstraintsActive[0][j] and RprConstraintsActive[1][j], and the reference picture resampling offsets RefRprLeftOffset[i][j], RefRprTopOffset[i][j], CurrRprLeftOffset[i][j], CurrRprTopOffset[i][j], are derived as follows:

```
for( i = 0; i < 2; i++ ) {
   for( j = 0, k = 0, pocBase = PicOrderCntVal; j < num_ref_entries[ i ][ RplsIdx[ i ] ]; j++) {
      ......
      fRefWidth is set equal to PicOutputWidthL of the reference picture RefPicList[ i ][ j ]
      fRefHeight is set equal to PicOutputHeightL of the reference picture RefPicList[ i ][ j ]
         fCurrWidth = PicOutputWidthL
         fCurrHeight = PicOutputHeightL
         refPicWidth, refPicHeight, refScalingWinLeftOffset, refScalingWinRightOffset, refScalingWinTopOffset,
            and refScalingWinBottomOffset, are set equal to the values of pic_width_in_luma_samples,
               pic_height_in_luma_samples, scaling_win_left_offset, scaling_win_right_offset,
               scaling_win_top_offset, and scaling_win_bottom_offset, respectively, of the
      reference picture   RefPicList[ i ][ j ]
         RefRprLeftOffset[ i ][ j ] = subWidthC * refScalingWinLeftOffset
         RefRprTopOffset[ i ][ j ] = subHeightC * refScalingWinTopOffset
         CurrRprLeftOffset[ i ][ j ] = subWidthC * scaling_win_left_offset
         CurrRprTopOffset[ i ][ j ] = subHeightC * scaling_win_top_offset
         if( ph_scaling_window_present_flag && slice_scaling_win_idc [ i ][ j ] != 0)
         {
            if (slice_scaling_win_idc[ i ][ j ]==1 ) {
               fRefWidth = refPicWidth - (PhScalingWinLeftOffset + PhScalingRightWinOffset)
               fRefHeight = refPicHeight - (PhScalingWinTopOffset + PhScalingWinBottomOffset )
               RefRprLeftOffset[ i ][ j ] = PhScalingWinLeftOffset
               RefRprTopOffset[ i ][ j ] = PhScalingWinTopOffset
            }
            else if( slice_scaling_win_idc[ i ][ j ]==2 ) {
               fCurrWidth = pic_width_in_luma_samples - (PhScalingWinLeftOffset + PhScalingWinRightOffset)
```

```
    fCurrHeight = pic_height_in_luma_samples - (PhScalingWinTopOffset +
PhScalingBottomWinOffset)
        CurrRprLeftOffset[ i ][ j ] = PhScalingWinLeftOffset
        CurrRprTopOffset[ i ][ j ] = PhScalingWinTopOffset
    }
}
    RefPicScale[ i ][ j ][ 0 ] = ( ( fRefWidth << 14 ) + ( fCurrWidth
>> 1 ) ) / fCurrWidth
    RefPicScale[ i ][ j ][ 1 ] = ( ( fRefHeight << 14 ) + ( fCurrHeight
>> 1 ) ) / fCurrHeight
    RprConstraintsActive[ i ][ j ] = ( pic_width_in_luma_samples != refPicWidth ||
        pic_height_in_luma_samples != refPicHeight ||
        CurrRprLeftOffset [ i ][ j ] != RefRprLeftOffset [ i ][ j ] ||
        CurrRprTopOffset[ i ][ j ] != RefRprTopOffset[ i ][ j ] ||
        fCurrWidth != fRefWidth ||
        fCurrHeight != fRefHeight )
    }
}
```

When RprConstraintsActive[i] [j] is equal to 1, the following constraints apply:
  RefPicScale[i][j][0] shall be less than or equal to $2^{15}$.
  RefPicScale[i][j][0] shall be greater than or equal to $2^{11}$.
  RefPicScale[i][j][1] shall be less than or equal to $2^{15}$.
  RefPicScale[i][j][1] shall be greater than or equal to $2^{11}$.

8.5.6.3.2 General

Inputs to this process are:
  a luma location (xSb, ySb) specifying the top-left sample of the current coding subblock relative to the top-left luma sample of the current picture,
  a variable sbWidth specifying the width of the current coding subblock,
  a variable sbHeight specifying the height of the current coding subblock,
  a motion vector offset mvOffset,
  a refined motion vector refMvLX,
  the selected reference picture sample array refPicLX, with
    a value X representing its corresponding reference list and a corresponding reference index refIdxLX,
  the half sample interpolation filter index hpelIfIdx,
  the decoder-side motion vector refinement flag dmvrFlag,
  the bi-directional optical flow flag bdofFlag,
  a variable refPicIsScaled indicating whether the selected reference picture requires scaling,
  a variable cIdx specifying the colour component index of the current block,
  a list of two scaling ratios, horizontal and vertical, scalingRatio, with scalingRatio[0] equal to RefPicScale[X][refIdxLX][0] and scalingRatio[1] equal to RefPicScale[X][refIdxLX][1],
  a list of offsets RefRprLeftOffset[X][refIdxLX], RefRprTopOffset[X][refIdxLX], CurrRprLeftOffset[X][refIdxLX], and CurrRprTopOffset[X][refIdxLX], corresponding to the selected reference picture sample array refPicLX.

Outputs of this process are:
  an (sbWidth+brdExtSize)×(sbHeight+brdExtSize) array predSamplesLX of prediction sample values.

The prediction block border extension size brdExtSize is derived as follows:

$$brdExtSize=(bdofFlag||(inter\_affine\_flag[xSb][ySb]\&\& !ph\_disable\_prof\_flag))?2:0 \quad (934)$$

The variable refWraparoundEnabledFlag is set equal to (pps_ref_wraparound_enabled_flag && !refPicIsScaled).

The variable fRefLeftOffset is set equal to ((RefRprLeftOffset[X][refIdxLX])<<10), The variable fReflopOffset is set equal to ((RefRprTopOffset[X][refIdxLX])<<10)

The variable fCurrLeftOffset is set equal to CurrRprLeftOffset[X][refIdxLX].

The variable fCurrTopOffset is set equal to CurrRprTopOffset[X][refIdxLX].

The (sbWidth+brdExtSize)×(sbHeight+brdExtSize) array predSamplesLX of prediction sample values is derived as follows:
  The motion vector mvLX is set equal to (refMvLX−mvOffset).
  If cIdx is equal to 0, the following applies:
    Let $(xInt_L, yInt_L)$ be a luma location given in full-sample units and $(xFrac_L, yFrac_L)$ be an offset given in 1/16-sample units. These variables are used only in this clause for specifying fractional-sample locations inside the reference sample arrays refPicLX.
    The top-left coordinate of the bounding block for reference sample padding $(xSbInt_L, ySbInt_L)$ is set equal to (xSb+(mvLX[0]>>4), ySb+(mvLX[1]>>4)).
    For each luma sample location ($x_L$=0 ... sbWidth−1+brdExtSize, $y_L$=0 ... sbHeight−1+brdExtSize) inside the prediction luma sample array predSamplesLX, the corresponding prediction luma sample value predSamplesLX[$x_L$][$y_L$] is derived as follows:
      Let (refxSb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

$$refxSb_L=(((xSb-(fCurrLeftOffset))<<4)+refMvLX[0])*scalingRatio[0] \quad (935)$$

$$refx_L=((Sign(refxSb_L)*((Abs(refxSb_L)+128)>>8)+x_L*((scalingRatio[0]+8)>>4))+fRefLeftOffset+32)>>6 \quad (936)$$

$$refySb_L=(((ySb-(fCurrTopOffset))<<4)+refMvLX[1])*scalingRatio[1] \quad (937)$$

$$refy_L=((Sign(refySb_L)*((Abs(refySb_L)+128)>>8)+yL*((scalingRatio[1]+8)>>4))+fRefTopOffset+32)>>6 \quad (938)$$

The variables xInt$_L$, yInt$_L$, xFrac$_L$ and yFrac$_L$ are derived as follows:

$$xInt_L = refx_L >> 4 \quad (939)$$

$$yInt_L = refy_L >> 4 \quad (940)$$

$$xFrac_L = refx_L \ \& \ 15 \quad (941)$$

$$yFrac_L = refy_L \ \& \ 15 \quad (942)$$

The prediction luma sample value predSamplesLX [x$_L$][y$_L$] is derived as follows:
  If bdofFlag is equal to TRUE or (ph_disable_prof_flag is equal to FALSE and inter_affine_flag[xSb][ySb] is equal to TRUE), and one or more of the following conditions are true, the prediction luma sample value predSamplesLX [x$_L$][y$_L$] is derived by invoking the luma integer sample fetching process as specified in clause 8.5.6.3.3 with (xInt$_L$+(xFrac$_L$>>3)−1), yInt$_L$+(yFrac$_L$>>3)−1), refPicLX, and refWraparoundEnabledFlag as inputs.
    x$_L$ is equal to 0.
    x$_L$ is equal to sbWidth+1.
    y$_L$ is equal to 0.
    y$_L$ is equal to sbHeight+1.
  Otherwise, the prediction luma sample value predSamplesLX[xL][yL] is derived by invoking the luma sample 8-tap interpolation filtering process as specified in clause 8.5.6.3.2 with (xIntL−(brdExtSize>0? 1:0), yIntL−(brdExtSize>0? 1:0)), (xFracL, yFracL), (xSbInt$_L$, ySbInt$_L$), refPicLX, hpelIfIdx, sbWidth, sbHeight, dmvrFlag, refWraparoundEnabledFlag, scalingRatio[0], scalingRatio[1], and (xSb, ySb) as inputs.
Otherwise (cIdx is not equal to 0), the following applies:
  Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
  The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).
  For each chroma sample location (xC=0 . . . sbWidth−1, yC=0 . . . sbHeight-1) inside the prediction chroma sample arrays predSamplesLX, the corresponding prediction chroma sample value predSamplesLX[xC][yC] is derived as follows:
    Let (refxSb$_C$, refySb$_C$) and (refx$_C$, refy$_C$) be chroma locations pointed to by a motion vector (refMvLX [0], refMvLX[1]) given in 1/32-sample units. The variables refxSb$_C$, refySb$_C$, refx$_C$ and refy$_C$ are derived as follows:

$$addX = sps\_chroma\_horizontal\_collocated\_flag?0:8* \\ (scalingRatio[0]-(1<<14)) \quad (943)$$

$$addY = sps\_chroma\_vertical\_collocated\_flag?0:8* \\ (scalingRatio[1]-(1<<14)) \quad (944)$$

$$refxSb_C = (((xSb-(fCurrLeftOffset))/SubWidthC<<5)+ \\ refMvLX[0])*scalingRatio[0]+addX \quad (945)$$

$$refx_C = ((Sign(refxSb_C)*((Abs(refxSb_C)+256)>>9)+ \\ xC*((scalingRatio[0]+8)>>4))+fRefLeftOffset/ \\ SubWidthC+16) >>5 \quad (946)$$

$$refySb_C = (((ySb-(fCurrTopOffset))/SubHeightC<<5)+ \\ refMvLX[1])*scalingRatio[1]+addY \quad (947)$$

$$refy_C = ((Sign(refySb_C)*((Abs(refySb_C)+256)>>9)+ \\ yC*((scalingRatio[1]+8)>>4))+fRefTopOffset/ \\ SubHeightC+16)>>5 \quad (948)$$

The variables xInt$_C$, yInt$_C$, xFrac$_C$ and yFrac$_C$ are derived as follows:

$$xInt_C = refx_C >> 5 \quad (949)$$

$$yInt_C = refy_C >> 5 \quad (950)$$

$$xFrac_C = refx_C \ \& \ 31 \quad (951)$$

$$yFrac_C = refy_C \ \& \ 31 \quad (952)$$

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight, refPicLX, dmvrFlag, refWraparoundEnabledFlag, scalingRatio[0], and scalingRatio[1] as inputs.
NOTE—Unlike the process specified in clause 8.4.5.2.13, this process uses both sps_chroma_vertical_collocated_flag and sps_chroma_horizontal_collocated_flag.

What is claimed is:

1. A method to decode a coded bitstream with region of interest (ROI) support, the method performed by a processor and comprising:
  receiving a coded bitstream comprising coded pictures and syntax parameters for one or more regions of interest (ROI) within the coded pictures, wherein the syntax parameters comprise a picture header with ROI picture header parameters and a slice header with ROI slice header parameters, wherein the ROI picture header parameters comprise an ROI enabling flag and ROI offset parameters for a scaling window, and the ROI slice header parameters comprise an ROI switch parameter denoting whether ROI scaling is enabled at a slice level and whether the ROI offset parameters in the picture header are applied to a reference picture or a current picture; and
  decoding a coded region in a current picture in the coded bitstream, wherein decoding the coded region comprises:
    for the current picture and an active reference picture in an Inter slice:
      initializing a default scaling window in the Inter slice using values defined in a picture parameter set;
      if detecting that the ROI enabling flag is set to 1:
        overriding the parameters of the default scaling window based on the ROI offset parameters and the ROI switch parameter to generate an ROI scaling window; and
        applying reference picture resampling using the ROI scaling window.

2. The method of claim 1, wherein for the active reference picture, the ROI switch parameter comprises three values: 0, denoting to not override the default scaling window, 1, denoting to generate the ROI scaling window in the active reference picture, and 2, denoting to generate the ROI scaling window in the current picture.

3. The method of claim 1, wherein the ROI offset parameters comprise absolute left, right, top, and bottom offsets for the scaling window which replace original offset values of the scaling window.

4. The method of claim 1, wherein the ROI offset parameters comprise delta left, right, top, and bottom offsets for the scaling window which need to be added to original offset values of the scaling window.

5. A method to decode a coded bitstream with region of interest (ROI) support, the method performed by a processor and comprising:

receiving a coded bitstream comprising coded pictures and syntax parameters for one or more regions of interest (ROI) within the coded pictures, wherein the syntax parameters comprise a picture header with ROI picture header parameters and a slice header with ROI slice header parameters, wherein the ROI picture header parameters comprise an ROI switch parameter and ROI offset parameters for a scaling window, and the ROI slice header parameters comprise a slice ROI enable flag, wherein the ROI switch parameter denotes whether ROI scaling is enabled, and if enabled, whether the ROI offset parameters in the picture header are applied to a reference picture or a current picture; and decoding a coded region in a current picture in the coded bitstream, wherein decoding the coded region comprises:

for the current picture and an active reference picture in an Inter slice:

initializing a default scaling window in the Inter slice using values defined in a picture parameter set;

if detecting using the ROI switch parameter that ROI scaling is enabled:

if detecting that the slice ROI enable flag is enabled:

overriding the parameters of the default scaling window based on the ROI offset parameters and the ROI switch parameters to generate an ROI scaling window; and applying reference picture resampling using the ROI scaling window.

6. The method of claim 5, wherein the ROI switch parameter comprises three values: 0, denoting no ROI scaling is enabled, 1, denoting to generate the ROI scaling window in the active reference picture, and 2, denoting to generate the ROI scaling window in the current picture.

7. The method of claim 5, wherein the ROI offset parameters comprise absolute left, right, top, and bottom offsets for the scaling window which replace original offset values of the scaling window.

8. The method of claim 5, wherein the ROI offset parameters comprise delta left, right, top, and bottom offsets for the scaling window which need to be added to original offset values of the scaling window.

9. A non-transitory computer-readable storage medium having stored thereon computer-executable instructions for executing with one or more processors a method in accordance with claim 1.

10. An apparatus comprising a processor and configured to perform the method of claim 1.

* * * * *